(12) United States Patent
Werder et al.

(10) Patent No.: US 12,231,488 B2
(45) Date of Patent: Feb. 18, 2025

(54) DIGITAL CROSS-NETWORK PLATFORM, AND METHOD THEREOF

(71) Applicant: Swiss Reinsurance Company Ltd., Zurich (CH)

(72) Inventors: Marc Werder, Aarau (CH); Philipp Taha, Zurich (CH)

(73) Assignee: Swiss Reinsurance Company Ltd., Zurich (CH)

( * ) Notice: Subject to any disclaimer, the term of this patent is extended or adjusted under 35 U.S.C. 154(b) by 995 days.

(21) Appl. No.: 17/219,738

(22) Filed: Mar. 31, 2021

(65) Prior Publication Data
US 2021/0390465 A1 Dec. 16, 2021

Related U.S. Application Data

(63) Continuation of application No. PCT/EP2020/066349, filed on Jun. 12, 2020.

(51) Int. Cl.
*H04L 29/00* (2006.01)
*G06F 18/21* (2023.01)
(Continued)

(52) U.S. Cl.
CPC .......... *H04L 67/10* (2013.01); *G06F 18/217* (2023.01); *G06F 18/23211* (2023.01); *G06F 18/24147* (2023.01); *G06N 5/025* (2013.01); *G06N 20/10* (2019.01); *H04L 63/083* (2013.01); *H04L 63/10* (2013.01); *H04L 63/20* (2013.01); *H04L 67/562* (2022.05)

(58) Field of Classification Search
CPC ....... H04L 67/10; H04L 63/083; H04L 63/10; H04L 63/20; H04L 67/562; H04L 67/306; H04L 63/104; G06F 18/217; G06F 18/23211; G06F 18/24147; G06N 5/025; G06N 20/10; G06N 3/044; G06N 3/045; G06N 3/08; G06N 3/06; G06N 5/01; G06Q 10/10
See application file for complete search history.

(56) References Cited

U.S. PATENT DOCUMENTS 11,379,927 B1 * 7/2022 Alwis .................... G06Q 40/08
2013/0282407 A1 * 10/2013 Snyder .................. G06Q 40/08
705/4

(Continued)

*Primary Examiner* — Jeffrey C Pwu
*Assistant Examiner* — Helai Salehi
(74) *Attorney, Agent, or Firm* — Oblon, McClelland, Maier & Neustadt, L.L.P.

(57) ABSTRACT

A digital cross-network platform and method for providing controlled data- and process-driven cross-network interaction and program development between heterogeneous units with network-enabled devices on a secured cloud-based network, each unit having a unit or user account in the digital cross-network platform with assigned authentication and authorization credentials for authentication and authorization controlled network access to the digital cross-network platform and the secured cloud-based network, and each unit having an assigned relationship with one or more other units stored in a persistent storage of the digital networking platform, each assigned relationship providing a defined relationship between the one or more other units or a subgroup of the one or more other units and an associated program.

15 Claims, 14 Drawing Sheets

(51) Int. Cl.
*G06F 18/23211* (2023.01)
*G06F 18/2413* (2023.01)
*G06N 5/025* (2023.01)
*G06N 20/10* (2019.01)
*H04L 9/40* (2022.01)
*H04L 67/10* (2022.01)
*H04L 67/562* (2022.01)

(56) References Cited

U.S. PATENT DOCUMENTS

2020/0142856 A1\* 5/2020 Neelamana ......... G06F 18/2178
2023/0418958 A1\* 12/2023 Kanderal ............. G06F 21/606

\* cited by examiner

DIGITAL CROSS-NETWORK PLATFORM, AND METHOD THEREOF

CROSS REFERENCE TO RELATED APPLICATION

The present application is a continuation application of International Patent Application No. PCT/EP2020/066349, filed on Jun. 12, 2020, the content of which is hereby incorporated by reference in its entirety.

FIELD OF THE INVENTION

The present invention relates to a digital cross-network system and platform for providing controlled data- and process-driven cross-network data-access, multi-user interaction and program/project development, as international business (IB) program development, between a plurality of units/users with web-enabled devices on a secured cloud-based network. In particular, the invention relates to digital platforms facilitating cross-network and multi-standard collaboration in a secured, cloud-based network communication with the digital platform with different classes/groups of units having an assigned relationship to other units for the process-driven cross-network interaction and program/project development. The set-up of the relationships provide basis for the cross-network collaboration and process-driven program development. The inventive digital platform allows to overcome the known process frictions of such platforms as e.g. induced by lack of standardization and driving cross-network complexity. Further, web-based productivity features can provide enhancements to the users'/units' environment so that users assigned to a program can collaborate over the digital platform using the platform according to the established relationships.

BACKGROUND OF THE INVENTION

The research, development and enterprise world is changing faster than ever. To compete, it is now necessary to develop and exchange technology and data, do transactions and business at an almost unprecedented size and scale and reaction time-frame, in particular collaborating and cross-networking with units and people distributed almost over the whole globe. In order to achieve this scale, there is a huge demand for new better suited technology to establishing and develop digital platforms that extend the organizational boundaries and technical limitation of market participants. In fact, in the recent years, digital platform technology is emerging as one of the most powerful technical manifestations of the digital revolution, which is also referred to as the "fourth industrial revolution" or in short industry 4.0. Thanks to rapid advances in cloud, mobile and analytics, and the falling cost of these new technologies, digital platforms are able to create the next step of growth and breakthrough technology for innovation. Digital platforms allow to bring together vast development, research and collaboration communities of customers, partners, developers and engineers. Digital platform technology allows them to create cross-network innovation and developments, in particular program developments at an enormous scale and efficiency. Further, this technology allows to enable new levels of cross-network collaboration between companies from different technology fields and industry sectors that can result in the conception of entirely new technologies, products and services.

The impact and importance of the fast developments in digital platform technology, IoT and cloud-based technologies can hardly be overestimated and may be demonstrated by looking at the changing theories on International Business (IB). Typically, international business have been based on assumptions of tangible flows of goods and services, restricted access to open resources, monetized transactions across national borders, and large organizations that compete in an environment full of physical barriers. For instance, it was assumed that IB built largely on transaction cost economics, has served as the theoretical foundation for much of the extant research on IB and has informed on a number of key issues relating to multinational enterprises (MNEs) including their location choice, entry mode, knowledge transfer, and organizational design. However, the emergence of digital technologies and adaptive business structures have begun to reshape the nature and structure of the global economy. Global business operations are increasingly characterized by intangible flows of data and information, greater availability of key open resources including technologies, heightened importance of digital infrastructure, instant worldwide access to knowledge and expertise, more exchanges of free content and services, and growing role of small enterprises in economic activity and technology development. These changes make it necessary to reassess long held assumptions about the global business environment and demonstrate the deep impact of these emerging digital technologies. In particular, the technical advancements in new developed digital platform technologies brought a shift from individual products or services to secured platforms as technological basis for offering value and an emergence of associated ecosystems as a major venue for innovation, technology development, value creation and delivery. This had major implications for R&D and IB. Digital platforms constitute a shared set of technologies, components, services, architecture, and relationships that serve as a technical foundation for diverse sets of actors to converge and create value.

Platform-based ecosystems then denote these sets of actors who are aligned to pursue propositions by exhibiting varying types of mutual dependencies and boundary conditions borne out of their co-specialization and complementarities in the technical platform context. This, in turn, also implies different roles for actors to play in the ecosystem (for example for risk-transfer: risk-exposed units, carriers, brokers), wherein the interdependencies technically needs to be standardized within each role and e.g. the consequent need for different types of skills, capabilities and strategies. Digital platforms and ecosystems (DPEs) technologies can also be used to transcend borders, locations, and industries. Collaborative interactions among ecosystem members reflect and reinforce these members' co-specialization in different economic activities that are often situated in different countries and managed by a central player (the platform provider). Such digital platforms are sometimes also referred as "global (virtual) factory" to characterize a business network in which an MNE may be a member in specifically added areas. Digital platforms enable cross-border as well as cross-sector collaboration opportunities with partners operating in varying industries, significantly extending an MNE's nexus of network. These DPEs foster the availability and usage of open resources for all sizes of businesses, embracing many micro-MNEs that participate in global competition.

The increasing significance of digital platforms and associated ecosystems is based and driven by the emergence of new digital infrastructures (e.g., Internet of Things, cloud computing, blockchain, big data analytics) and the infusion of digital technologies in products, services and processes.

The availability of ubiquitous digital infrastructures that underlie digital platforms has radically restructured the nature, ways, processes, structure as well as the cost of doing businesses internationally. Thus, there is a huge demand for appropriate technology for digital platforms allowing a controlled and structured cross-network interaction between the participants of the virtual ecosystem.

For ecosystems build to allow controlled developing of international business programs for risk-transfer, i.e. between carrier, risk-exposed units and brokers, such digital platforms technically rely on or involve build-in risk assessments or measuring structures. However, the machine-based prediction or forecast of occurrence probabilities for events causing impacts, i.e. occurring risks, is technically difficult to be realized because of their long-tail nature and their susceptibility to measuring and parametrizing quantitative impact factors and to capturing temporal time developments and parameter fluctuations. Automation of prediction and modeling of catastrophes and risk accumulation is especially challenging as there is limited historic loss data available, and new risk events with new characteristics keep emerging. In addition to finding, triggering and/or mitigating valuable loss and exposure data where existing, it can also be important to reduce the reliance on historic data by using novel modelling techniques going beyond traditional data analysis and predictive modeling approaches and techniques by monitoring a controllable cause-effect chain. Risk driven systems have been developed and used triggered and signaled by automated forecast systems. Such systems are able to predictively and quantitatively generate expected occurrence probability of physical events and their impact such as losses to physical assets and objects typically starting from a set of modelling scenarios, which heavily depend in their timely development on the modelling technique. So there is a further requirement, to provide a new technical system to overcome these problems in International Business program development of risk-transfers.

Finally, existing platform solutions typically group users together, in essence, assuming a common relationship between all members of the group. Such a relationship may not exist. In fact, grouping users together and treating them all as if they were the same is the type of behavior which should for most application be avoided, because such grouping neglects the various needs of the individual users. Unfortunately, neither of the existing digital platform solutions address these needs and the concerns of complex ecosystems.

Thus, in summary, there is a need for a distributed, cross-platform, dynamic, Internet-based, relationship-centric, collaboration environment for facilitating collaboration work across geographic, physical and virtual boundaries.

SUMMARY OF THE INVENTION

It is an object of the invention to provide a digital cross-network system and platform for controlled data- and process-driven cross-network data-access, multi-user interaction and program/project development, in particular for development of programs associated with international business (IB). Further the automated platform should allow for systematic capturing, measuring, quantifying, and forward-looking generating of appropriate risk and risk accumulation measures for program developments and projects capturing physical real-world assets and objects based on physical risk measuring parameter values and data. Further, the system should be able to connect directly to the core flow of data of the present digital society comprising Internet of Things and industry 4.0 technologies, by providing a new technology for automated digital international program development, risk assessment and forecasting platforms. It is a further object to provide a digital platform as a technology-enabled cross-network structure that facilitates structured or hierarchical exchanges on various levels, as data, executables, requests, instructions, or all kind of electronic signal exchange, between two or more interdependent groups or individuals. The digital platform should allow to bring together different classes/groups of users, as carriers and brokers, program and project engineers, providers and producers to transact and interact smoothly with each other. It should also enable users or companies to share data/information to enhance collaboration, development and innovation of new programs, products and services in IB. The platform's ecosystem should allow to connect two or more sides, creating network effects. The digital platform may also be realized to allow third parties' provision of application programming interfaces (APIs) that enable participants to share data to create new services. Based on cloud and other technologies, the digital platform should allow to provide cross-network programs, projects or resources on an as-a-service basis. The platform should allow to operate under clear governance conditions that protect program developments, technology secrets, intellectual property and data ownership. Further, the invention should be scalable, and used simulation technics should be easily accessible to the physical assets' analytics. The invention should in particular allow for a standardization and normalization of the used data and measuring parameters/factors, as used risk factors and measuring values of an automated risk-transfer underwriting process. Further, the invention should be easily integratable in other processes, productions chains or risk assessment and measuring systems. Finally, the invention should be enabled to standardized cross-network use of data and measuring parameters from multiple heterogeneous data sources, inter alia from IoT sensory. The probability measures and risk forecasts should allow to capture various device and environmental structures, providing a precise and reproducible measuring of risk factors, and allowing to optimize associated event occurrence impacts of the captured risk events, in particular for standardized cross-network underwriting and risk-transfer pricing. In the context of automated risk-transfer, and appropriate risk-transfer and structure developments, the invention should provide a digital platform for international programs development as a digital service. In particular, it should allow controlled access to local users/partners for specific policy issuance and claims handling. The platform should provide the technical structure to shift capital across geographies and manage local claims payments. The digital platform should allow automated, electronic and cross-network policy issuance, information management and controlled knowledge exchange. The digital platform's policy framework should be able to deliver broad coverage and high degree of contract certainty, and access-controlled network knowledge development and cross-network guidance, in particular real-time guidance and feedback signaling, on execution of International Programs.

According to the present invention, these objects are achieved particularly through the features of the independent claims. In addition, further advantageous embodiments follow from the dependent claims and the description.

According to the present invention, the abovementioned objects are particularly achieved by the digital cross-network platform for providing controlled data- and process-driven cross-network interaction and program development between heterogeneous units with web-enabled devices on a secured cloud-based network, each unit having a unit or user account in the digital cross-network platform with assigned authentication and authorization credentials for authentication and authorization controlled network access to the digital cross-network platform and the secured cloud-based network and, each unit having an assigned relationship with one or more other units comprised in a persistent storage of the digital networking platform, each assigned relationship providing a defined relationship between the one or more other units or a subgroup of the one or more other units and an associated program, the digital cross-network platform comprising a database for hosting all communication between units on the secure network; and a network-interface for users of the units using data-transmission network-enabled devices of the units to upload information to the persistent storage and to share the uploaded information with other people according to the assigned relationship, wherein the assigned relationship must be established between the pair of users prior to any communication between the pair of user units is permitted based on modular digital program data elements of the persistent storage capturing the assigned relationship in respect to a program associated with a modular digital program data element, and wherein a secured cloud-based network access is provided by a secure data transmission network interface of the digital cross-network platform over the data transmission network for each generated program and units based on the associated modular digital program data element and relationship, respectively.

The invention has inter alia the advantages that the invention allows to link a large number of data exchanges amongst different groups and subgroups of digital platform users and/or units, as e.g. carriers, brokers and customers, in particular with or without relation to relation mutual constraints. Thereby, the invention allows to provide a common source of data, which was not possible in this context by the prior art systems. Further, it allows to evade the dduplication of efforts between users of the same group or subgroup but also between users of different groups/subgroups. Also, in a background of multiple regulatory regimes' parameter constraints, various languages, and/or multiple currencies requirements for financial parameter exchange and accounting, the invention allows to develop and provide one common product description and/or coverage description and/or process definition. The invention further allows by means of the proposed digital cross-network platform to overcome the prior art problems regarding cross-network collaboration and lack of standardization driving complexity and leading to process frictions in policy issuance, cash movement, risk engineering services and automated claim handling, i.e. the acknowledged technical problems and process frictions of prior art systems regarding dynamic cross-network collaboration and dynamic real-time interaction and the technical problems of standardized automated handling of multi-users and multi-groups development and collaboration process under a huge amount of divergent external and inherent constraint parameters. Thus the innovative technology is able to fundamentally address the technical issue of high friction in dynamic information flow and improve quality experience for the users, as e.g. customer, carrier and broker, in the dynamic program development process from its beginning to the claim handling. Further, the invention has the advantage to provide a cloud-based digital platform for IPaaS, i.e. International Programs as a Service (IPaaS) and multi-user real-time cross-network IB (International Business) and international technical collaboration program/project development.

In an embodiment variant, each assigned relationship is hierarchical defining at least two subgroups with a first subgroup comprising a plurality of carrier units $C_{21}$, $C_{21}$, ..., $C_{2i}$ defined by modular carrier unit data element and a second subgroup comprising a plurality of broker units $B_{21}$, $B_{21}$, ..., $B_{2i}$ defined by modular broker unit data elements. The embodiment variant can e.g. also comprise a further group/subgroup assigned to risk-exposed units $U_{21}$, $U_{21}$, ..., $U_{2i}$, as insured customer. The embodiment variant can e.g. also comprise an even further group/subgroup assigned to second-layer risk-transfer carriers $R_{21}$, $R_{21}$, ..., $R_{2i}$, as reinsurance systems, in particular automated, digitized reinsurance systems. The secured cloud-based network access as provided by the secure data transmission network interface to a specific program and/or project can e.g. be different for the first subgroup of the carrier units $C_{21}$, $C_{21}$, ..., $C_{2i}$ and the second subgroup 3 of the broker units $B_{21}$, $B_{21}$, ..., $B_{2i}$ and/or the risk-exposed units $U_{21}$, $U_{21}$, ..., $U_{2i}$ and/or second-layer risk-transfer carriers $R_{21}$, $R_{21}$, ..., $R_{2i}$. This embodiment variant has inter alia the advantages, that it technically allows to process and develop international cross-network projects or programs with a heterogenous users' structure, in particular as described above by technically providing a cloud-based digital platform for IPaaS related to automated risk-transfer programs and multi-user real-time cross-network international risk-transfer and corresponding international dynamic collaboration program/project development. It further allows to provide an access to local partners and customer for policy issuance and claims handling around the globe. The technical structure of the invention allows to implement the ability to shift capital across geographies and manage local claims payments in heterogenous standards and networks. The digital cross-network platform provides automated policy issuance, information management and knowledge exchange, which is not possible with the prior art systems covering all technical and regulatory divergences. The invention further allows to technically implement an unified and standardized policy framework delivering broad coverage and high degree of contract certainty by considering all possible external boundary conditions. Finally, it has the advantages provide access to deep network knowledge and expert-system based guidance on execution of International Programs realizable by cross-network application of artificial intelligence module, as machine learning devices or neural network structures. The technical invention allows to reduce friction of information flow in all main areas, of the automated processes of digital platforms, in particular reduce friction within the own infrastructure of the users, i.e. the carriers, brokers and/or end users/customers, and it allows to reduce friction in interactions between customer, carriers and broker. Thus, the digital technology of the invention can fundamentally address the issue of high friction in information flow and improve service quality experience for the customer, carrier and broker. Finally, the proposed digital platform allows to offer a first of its kind SaaS offering for International Program administration in addition to the secured and controlled network access. The digital platform enables an efficient, seamless and auditable handling of international programs which cannot be provided by prior art systems in that sense. Key features are, inter alia, the central data capture of all relevant program dimension in combination with collaboration features to efficiently collaborate with the nodes of the digital platform network. The digital platform provides increased transparency and speed, which contributes to significantly increase the customer experience for program clients. The proposed technical platform leverages the core component of automated International Program Administration (IPA) systems and enables a more seamless integration into other technical platforms, for example of carrier networks.

In another embodiment variant, the network-interfaces of the digital cross-network platform are web-interfaces and the network-enabled devices are web-enabled devices, wherein the digital cross-network platform comprises selectable productivity tools for interfacing with the programs, the productivity tools being accessible from a web interface and at least comprising a task manager module and a collaboration module and a document management module. This embodiment variant has inter alia the same advantages as the embodiment variants mentioned above. In particular, The invention further has e.g. the advantages to leverage the digital technology to improve cross-network collaboration flow and service quality experience for the customers, carriers and brokers compared to the prior art systems, comprising (i) an automated, cloud-based International Program Administration (IPA) platform by means of the integrated digital platform to manage complex international business process. The IPA module of the digital platform provides (1) an automated program underwriting process from submission to post-bind activities, (2) Automated knowledge management, and (3) Secure, controlled information exchange with local offices and network partners;

(ii) a controlled cross-network collaboration portal allowing fronting users to interact directly with the IPA-module for the transactional interactions including: (1) Local policy issuance, (2) Platform-based endorsements, (3) Automated premium reporting and pricing, and (4) Automated claims handling and reporting;

(iii) automated real-time monitoring and surveillance means as an integrated technical part of the digital platform capturing sensory data from associated sensory devices and monitoring means providing users with real-time information flows regarding assigned international programs and processes, which comprises for automated risk-transfer processing, development and programs (1) automated policy issuance, dynamic premium adjusting/pricing and/or issuance, (2) automated premium collection e.g. by electronic payment transfer signalling and signal generation, and (3) automatedly steered claims handling. Thus, the automated real-time monitoring and surveillance means are realized as an online integrated technical part of the digital platform allowing the users, in particular the carrier and the broker, to monitor and manage their risk-transfer program/project from a secured access. It combines several aspects of the risk-transfer program development and processing onto one easy-to-use platform and provides an access to real-time measurements and information data. It allows to review the corresponding policy(-ies), track premium payments, submit loss notifications, monitor claims, track progress of a risk measure improvement and so forth;

(iv) a broker-specific automated IPA-platform by means of the integrated digital platform, which comprises (1) a transparent processing and handling of international cross-network program administration for brokers and broker units, (2) streamlined handling of programs independent of the carrier/broker network and network structure, (3) a central data management for users (carrier, broker and costumer) reporting and analytics, and (4) the means for a clear focus on cross-collaboration enablement and operational efficiency; and (v) a carrier-specific automated IPA-platform by means of the integrated digital platform, which comprises (1) a transparent processing and handling of international cross-network program administration for carriers and carrier units, (2) streamlined handling of programs independent of the carrier/broker network and network structure, (3) central data management for users (carrier, broker and costumer) reporting and analytics, and (4) the means for a clear focus on cross-collaboration enablement and operational efficiency For the automated claim handling (see above point 3) by the digital platform, the automated real-time monitoring and surveillance means are further realized to monitor, access and capture natural hazard exposure and measuring and sensory parameters from integrated measuring and sensory devices for natural hazard exposure or risks, i.e. probability measures for the occurrence of natural hazard events as flood, earthquake, hurricanes etc. for the risks worldwide by using the integrated catastrophic measuring means. The integrated catastrophic measuring means are realized as geo risk measuring tools specifically designed to provide swift measuring overviews and risk assessments/measurements of natural hazard exposures and occurrence probabilities, worldwide. The integrated catastrophic measuring means are e.g. used to measure and assess the risk, from individual locations to entire portfolios/allocations of locations and objects, by combining physical hazard measurements for appropriate measuring and sensory devices, loss impact measurements, exposure measure and individual risk-transfer characteristic and information data with selected background maps and satellite imagery. The integrated catastrophic measuring means use maps and data capturing/measuring, inter alia, climate change, catastrophic event impact, and population density measures (e.g. night-light measures). Using the integrated catastrophic measuring means of the digital platform allows to benefit from improved single risk assessments for better bottom-line results based on actual physical measuring data from measuring devices, sound product development support to facilitate growth and increased transparency over different markets. In addition, a unique high-resolution data allows including storm surge, tsunami, lightning and volcanic hazards measurements and real-time capturing. The inventive web-interface and web tool of the digital platform provides technically improved development of international and local business where a swift risk assessment is challenging. With the digital platform, the use and measuring of natural hazard measuring data e.g. outside applied core regions, gets consistent, high-quality data for the whole world, which also can be used as a fallback measurements on risk for any peril worldwide, while using the functionality for multi-location analysis from address encoding to accumulation control. The integrated catastrophic measuring means can e.g. comprise a web map services (WMS) module linked to the web-interface of the digital platform, which provides the digital platform with natural hazard information directly into a users'-specific program $P_{41}, P_{42}, \ldots, P_{4i}$. It enables the digital platform to further streamline in-house processes by accessing the digital platform's comprehensive natural hazard knowledge of below described artificial intelligence module via standardised interfaces (as e.g. API). In common with the integrated catastrophic measuring means, the WMS-module also covers perils measurements such as river flood, coastal flood, seismic hazard, tsunami, wind, hail and more. For risk measurements, the digital platform can e.g. comprise associated and/or integrated sensors or measuring devices for sensing environmental and other risk-driving physical parameters, which physically impact the risk-exposed real-world asset or object or insured individual and associated and/or integrated sensors or measuring devices for sensing operating or status parameters of the risk-exposed real-world asset or object or individual. The sensors or measuring devices can e.g. comprise interfaces for setting one or more wireless or wired connections between the digital platform and the sensors or measuring devices, wherein data links are settable by means of the wireless or wired connections between the digital platform and the sensors or measuring devices associated with the real-world asset or object or individual transmitting the parameters measured and/or captured by the sensors or measuring devices to the digital platform. Further, the measured or captured variation of a risk measure for an occurrence probability associated with the operation or status of the real-world asset or object or individual of the risk-transfer can be dynamically linked on the corresponding transfer of risk to an automated risk-transfer system controlled by the digital platform and the corresponding program $P_{41}$, $P_{42}$, ..., $P_{4i}$, respectively, wherein values of parameters characterizing the transfer of risk are optimized based on said measure for a future state or operation of the real-world asset or object or risk-exposed individual and/or based on the generated value time series of values over said future time period. In order to optimize the status of the real-world asset or object or individual or the probability of an occurrence of a predefined risk event, an optimizing adjustment of at least a subsystem of the real-world asset of object or individual can be triggered or signaled by means of the digital platform. The triggering by means of the digital platform can e.g. be performed by electronic signal transfer. Based on the measure for a future state or operation of the risk-exposed real-world asset or object or individual, a forecasted measure of an occurrence probability of one or more predefined risk events impacting the real-world asset or object or individual can be generated by propagating the parameters of a digital representation in controlled time series. As another embodiment variant, the digital platform can e.g. comprise and trigger an automated expert system of the digital platform by means of electronic signal transfer, wherein the digital platform triggers the transmission of a digital recommendation to a user interface generated by the expert system of the digital platform based on the measured value of the measure for a future state or operation of the real-world asset or object or individual and/or the measured probability of the occurrence of a predefined physical event to the real-world asset or object, and wherein the digital recommendation comprises indications for an optimization of the real-world asset or object or adoption of the structural, operational and/or environmental parameters.

BRIEF DESCRIPTION OF THE DRAWINGS

The present invention will be explained in more detail below relying on examples and with reference to these drawings in which:

Regarding automated program development for risk-transfer and automated risk-transfer it-self in such complex environments, FIGS. 1 and 2 illustrate how cross-network collaboration and lack of standardization driving complexity and leads to process frictions in policy issuance and/or monetary movements/transfers and/or risk engineering and/or automated claims' handling.

FIG. 4 shows a block diagram, schematically illustrating the reduction of friction within each network (broker, carrier, customer) by providing a unified digital cross-network platform 1 to these networks. The present invention provides a digital solutions for such a digital platform 1 to possibly participating automated digital broker units 3, carrier units 2 and customer units 8 to efficiently handle International Business projects through central data maintenance and orchestrating the data exchange within their respective heterogenous networks. As given by the features of claim 1, the digital platform 1 provides an electronic, technical, digital solutions providing an access point within these respective networks. It further provides a technical data gathering facility to feed into data exchange layers.

FIG. 5 shows a block diagram, schematically illustrating the orchestration of the data exchange between all participating units 2/3/8 of a project 4/41, ..., 4i via the data and event exchange layer. Thus, the invention provides a digital exchange platform 1 providing a data and event exchange layer to facilitate secure and protected data exchange between pre-defined participating units 2/3/8 and introduces data standards across all parties involved in one risk-transfer project. As given by the features of claim 1, the invention provides a digital, controlled and secure cross-network data exchange improving data consistency for each risk-transfer project 4. It further allows establishing data standards supporting the data exchange in a consistent way.

FIG. 6 shows a block diagram, schematically illustrating the inventive digital platform 1 as digital end-to-end open risk-transfer marketplace. The invention allows technically the controlled and secured data exchange between client units 8, broker units 3, carrier units 8 and network partner units on a transactional basis independent of pre-defined network relations and point-to-point solutions. Additionally, the invention technically allows external service providers to participate and provide services to all market participants using electronic means. Further the invention provides (i) an inventive digital and secured marketplace with open access for electronic risk-transfer market participants; (ii) a digital and secured data exchange between project 4 participants 2/3/8; (iii) a central and standardized data collection facility with secure and process driven access for project 4 participants 2/3/8; and (iv) a technically new, data-driven corporate risk, analytics and operational electronic services. The third step of the realization of the present invention, has inter alia the advantage that it allows (i) to cconsolidate corporate risk-transfer data and make it available to other project 4 participants 2/3/8; (ii) to remove the boundaries of requiring, pre-defined networks 6 in the existing corporate risk-transfers; (iii) to automatically create a more accurate mature corporate risk-transfer proposition for customers 8 as well as risk-transfer market participants 2/3. The inventive solution, thereby, (i) facilitates cost/monetary transparency, (ii) strengthens provided service levels, (iii) shifts focus towards a sharper value proposition, and (iv) offers new, value-adding risk, analytics and operational services to market participants.

As illustrated in FIG. 8, data vault modelling can be a database modelling technique to provide long-term historical storage of the used project 4 data e.g. coming from multiple operational components of the platform 1. Data vault modelling can e.g. also be used by the platform 1 for looking at historical data that deals with issues such as auditing, tracing of data, loading speed and resilience to change as well as to trace where all the data in the database came from. This means that, in the present case, every row in the data vault can e.g. be accompanied by record source and load date attributes, enabling a unit 2/3/8 to trace values back to the source.

Figure 1:
FIG. 1 shows a diagram, schematically illustrating the basic underlying drivers of the complexity in international, cross-network program/project $P_{41}$, $P_{42}$, ..., $P_{4i}$ development, as e.g. the development of International Business Programs (IBP). In the cross-network collaboration a large number of data exchanges amongst the units/users of the digital platform, as e.g. carrier units 2, brokers units 2 and/or customer units are seamless conductible without requiring a common source of data or producing duplication of efforts.
Figure 2:
FIG. 2 shows another diagram, schematically illustrating the basic underlying drivers of the complexity in international, cross-network program/project $P_{41}$, $P_{42}$, ..., $P_{4i}$ development, as e.g. the development of International Business Programs (IBP), based on the typical lack of standardization, for example induced by the involvement of multiple regulatory regimes with corresponding mandatory boundary condition parameters, multiple languages, and/or multiple currencies with multiple diverging requirements and mandatory parameters for electronic payment exchange, and resulting e.g. in a technically difficult to handle lack of common product description, coverage description, and/or process definition.
Figure 3:
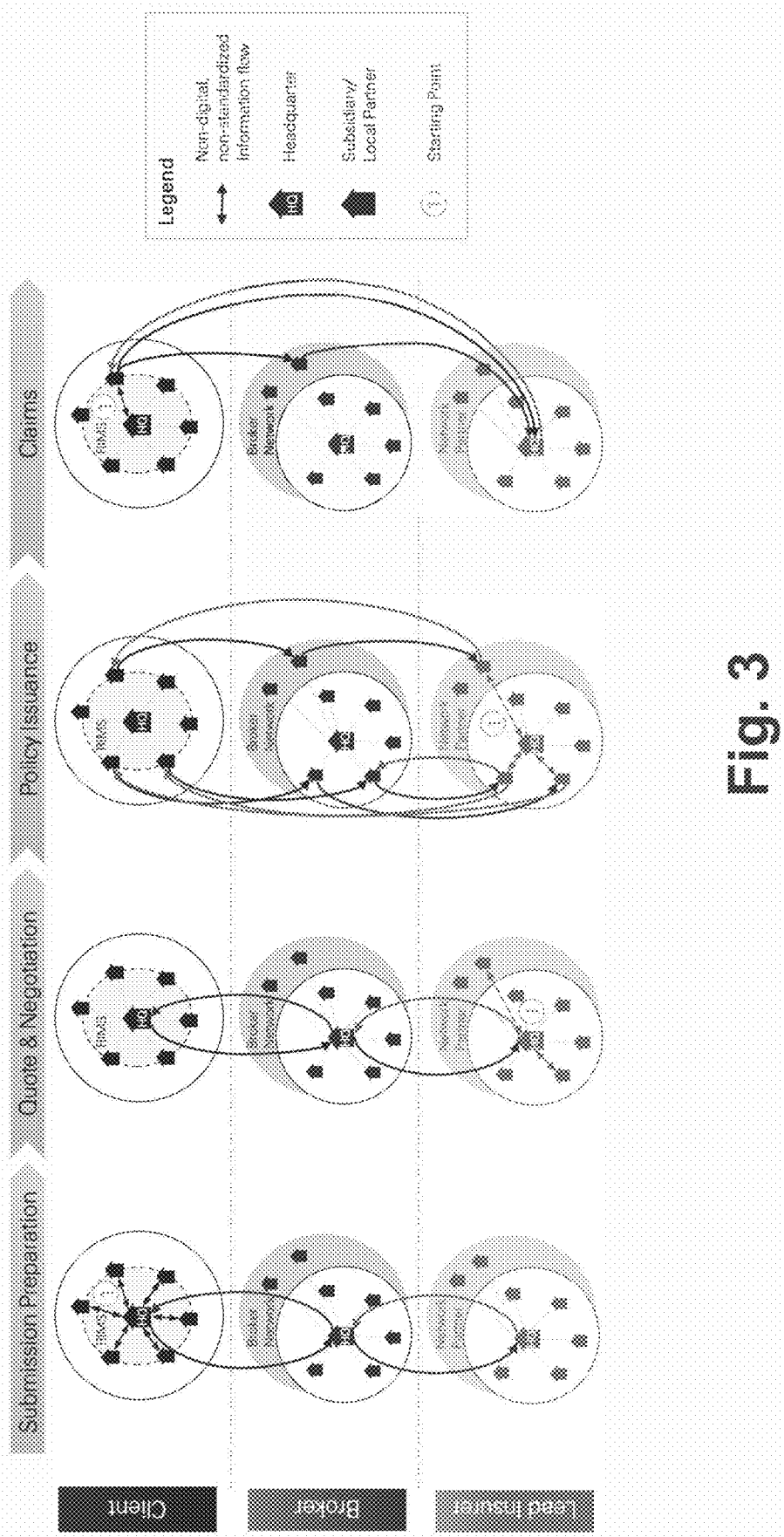
FIG. 3 shows a block diagram, schematically illustrating a layered, convoluted risk transfer process of the state of the art, wherein large number of transactional data exchanges between and across clients, brokers, carriers and their networks. In the state of the art, mainly large corporates buy access to such a project. A lack of capabilities of small/medium-sized brokers and insurers (servicing small/mid-corporates) as well as cost considerations or lack of awareness on a client side limit the demand in the small/mid-corporate client segment.
Figure 4:
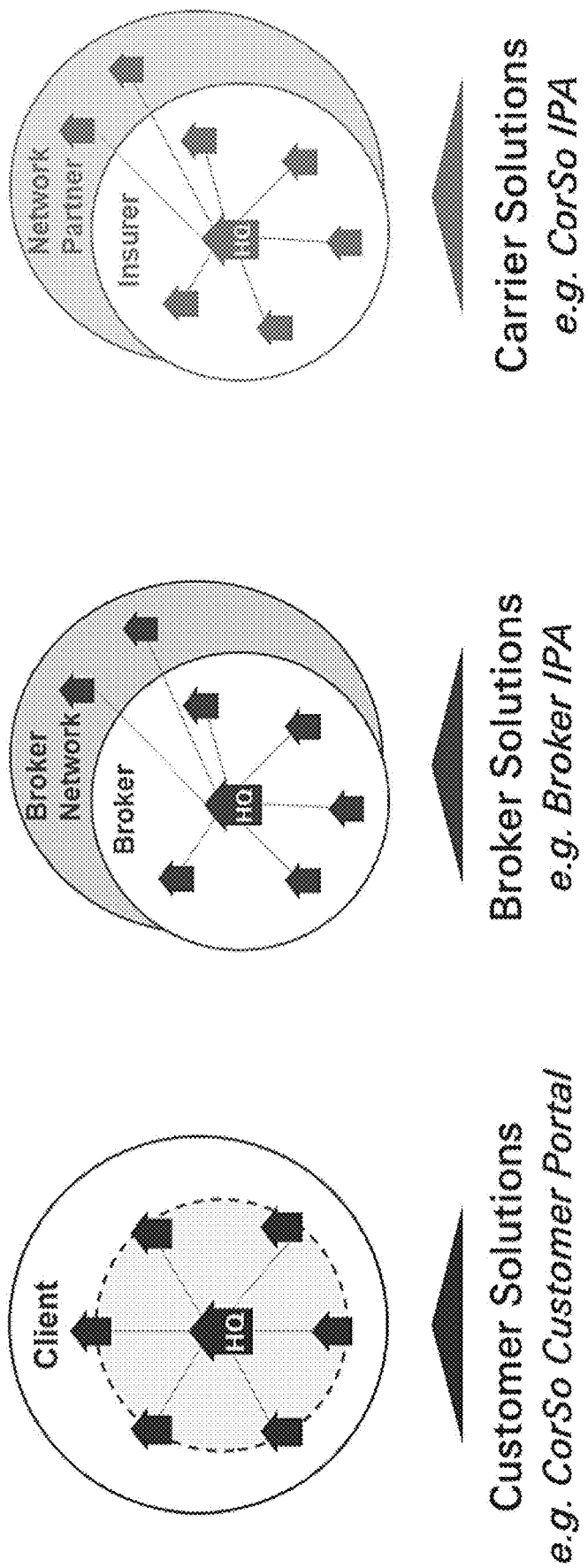
FIGS. 4-6 show block diagrams, schematically illustrating the solution of the objective technical problem in three (FIG. 4, 5, 6) steps. Automated customer units 8, broker units 3 and/or carrier units 2 experience a lot of friction when digitally handling International Business (IB) and exchanging data within and across networks 6. Furthermore, missing data consistency between the participating units 2/3 causes customer units 8 to accept a lot of uncertainty (e.g. local contracts) when applying an international insurance program cover.

For example, the monitoring of weather measuring parameters and natural catastrophe exposure measure 181 provides access and monitoring of natural hazard exposure for a unit's risk measures worldwide using. The unit 2/3/8 is enabled thereby to create its own customized risk profile for e.g. flood, earthquake and/or other natural hazards. The monitoring of project/program and policy parameter 182 can provide means for overviewing projects/program and policy parameters and further provides the technical means to monitor and manage a risk-transfer project 4 by a unit 2/3/8 and to review policy issuance and premium payment status, and to download policies, invoices and other relevant documents. The monitoring, tracking and managing of claims' parameter and service parameter 183 can e.g. comprise (i) submitting and tracking of loss notifications from any location instantly, (ii) downloading claims' parameters and documents such as First Notice of Loss and settlement letters, and (iii) automated analysis of loss history parameters. The monitoring, tracking and managing of risk engineering parameter and service parameters 184 can e.g. comprise (i) tracking of a unit's 2/3/8 risk exposures parameters and improvement measures worldwide, (ii) downloading site visit and risk improvement reports, (iii) consulting of risk engineer expert modules while implementing actions. The expert system advising with system-generated knowledge and industry parameters insights 185 can e.g. comprise (i) means for access to industry information data and research, (ii) accessing of dedicated underwriting, claims or risk engineering expert system advices to enquire about any aspect of a unit's 2/3/8 project 4.

Figure 10:
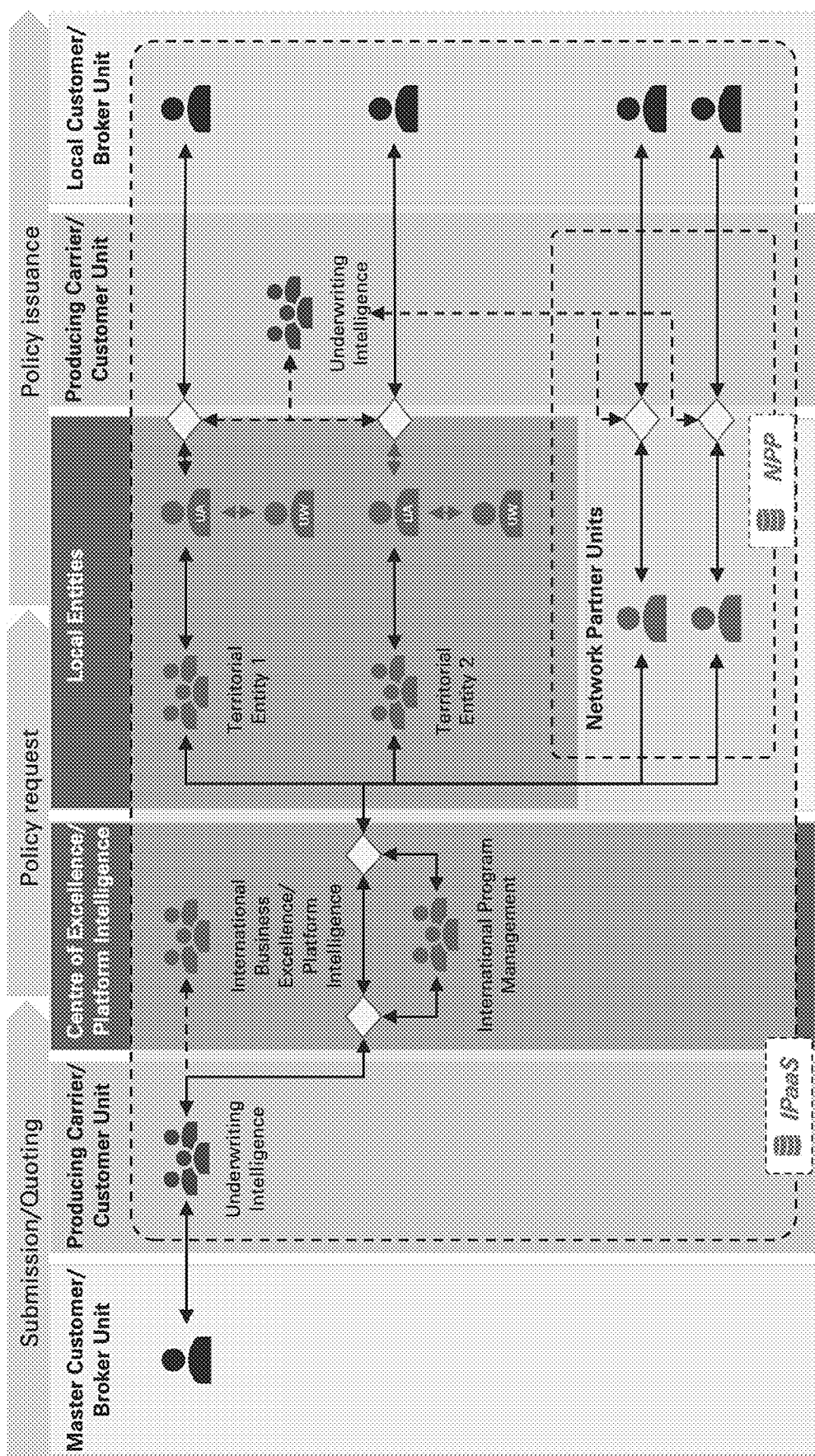

FIG. 10 shows a block diagram, schematically illustrating the interaction scheme of the various components in the digital platform 1 ensuring efficient and seamless program $P_{41}, P_{42}, \ldots, P_{4i}$ development and interaction. The digital platform 1 acts as centre of excellence, inter alia, support structuring and issuance of policies, particularly in respect of non-standard cases. The users/units 2/3 involved in a program $P_{41}, P_{42}, \ldots, P_{4i}$ operate in line with network parameter guidelines and parametrized service levels. In particular, the digital platform 1 allows straight-through processing, where possible. The dotted lines denote conditional interaction, while the solid lines denote required interaction.

Figure 11:
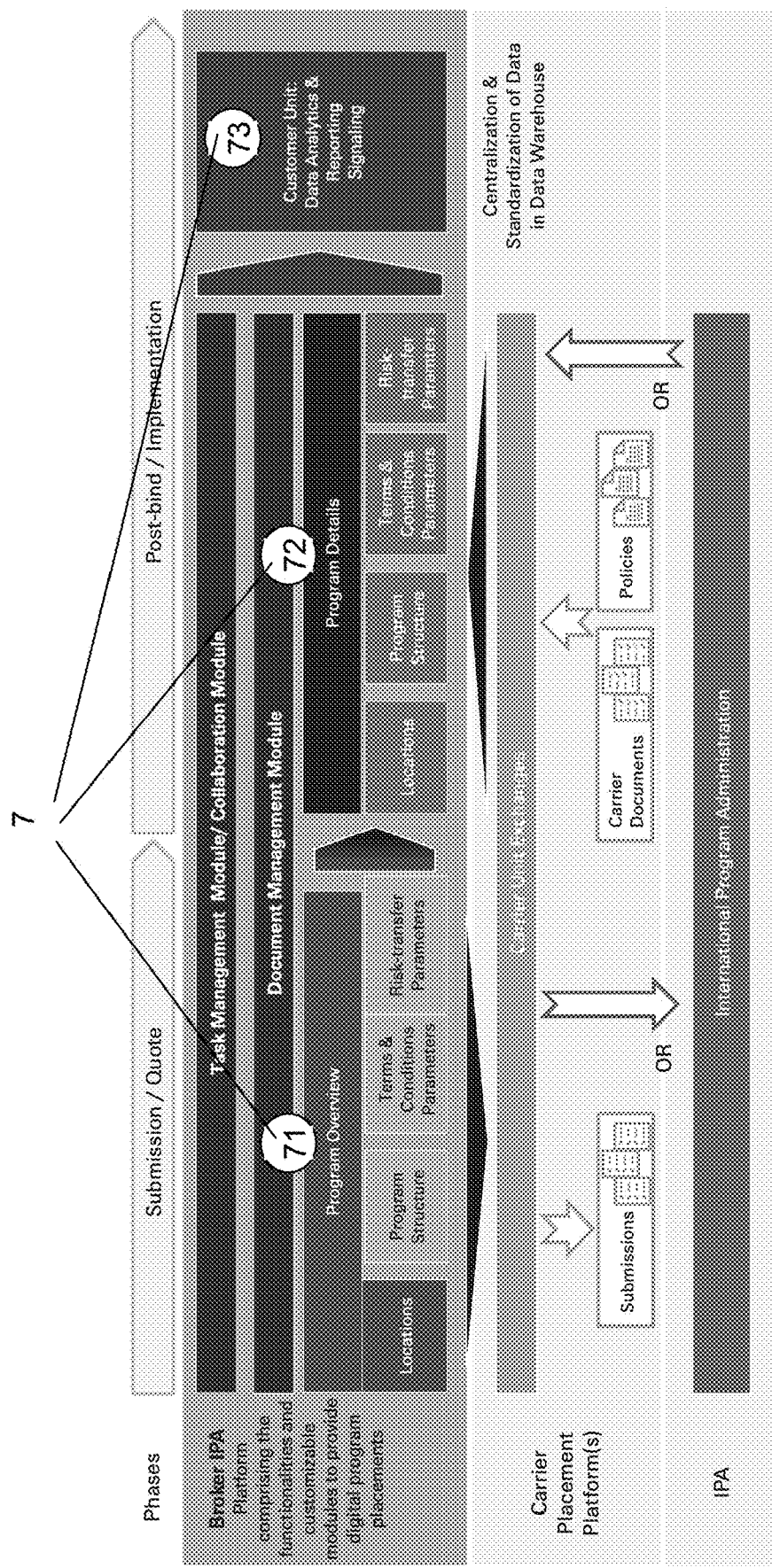

FIG. 11 shows a block diagram, schematically illustrating the scheme of the broker-specific automated IPA-platform of the digital platform 1. Reference number 71 denotes the efficient placement process provided by the digital platform 1 comprising (i) centralized users 2/3 data collection process across the global network, (ii) generating structured Requests For Quotes (RFQs), and (iii) consistent application of local regulatory requirements. Reference number 72 denotes the streamlined program administration process comprising (i) transparent and auditable underwriting (UW) processes, (ii) optimized workflow management, and (iii) centrally managed policies linked to a program or a user 2/3 account. Finally, reference number 73 denotes the real time data and information generation (measuring/capturing available for reporting and data analytics processes comprising the inventive integration of data reporting and risk modelling modules, in particular machine-learning based or artificial intelligence-based processing modules.

Figure 5:
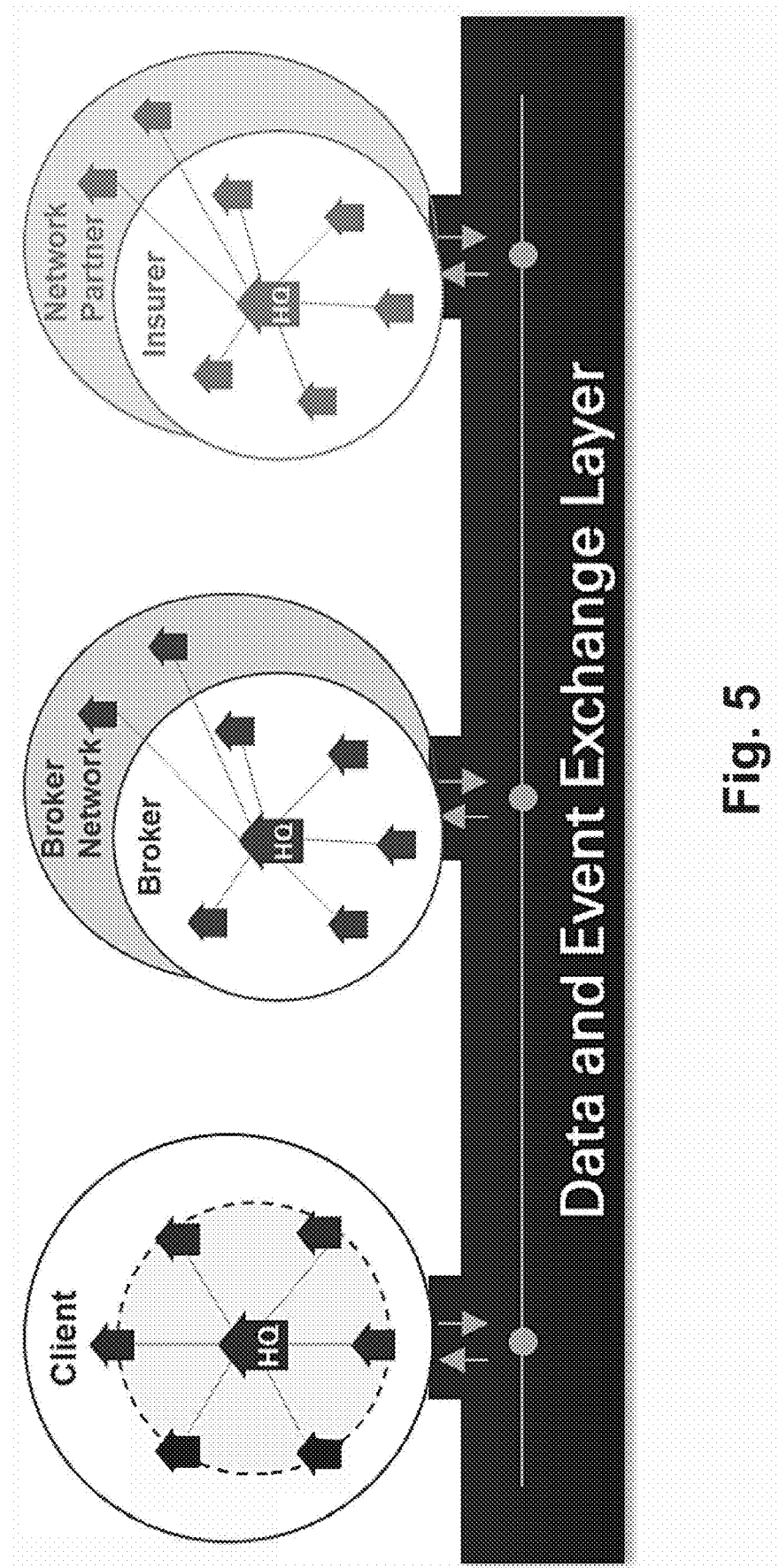
Figure 6:
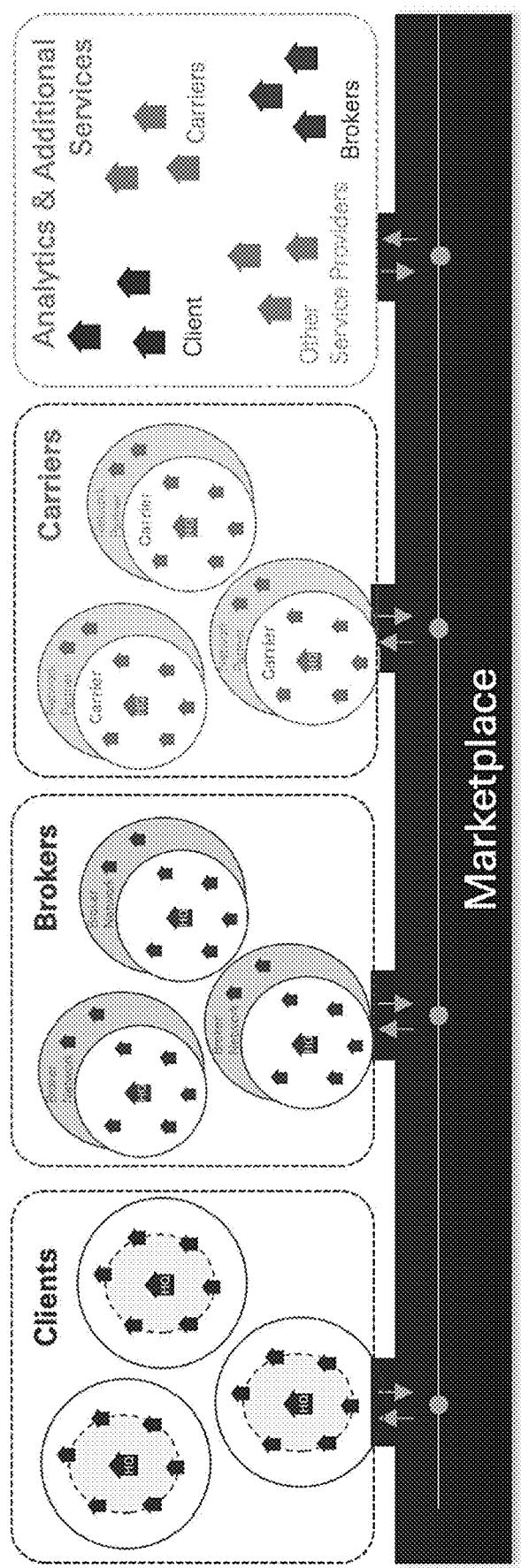
Figure 7:
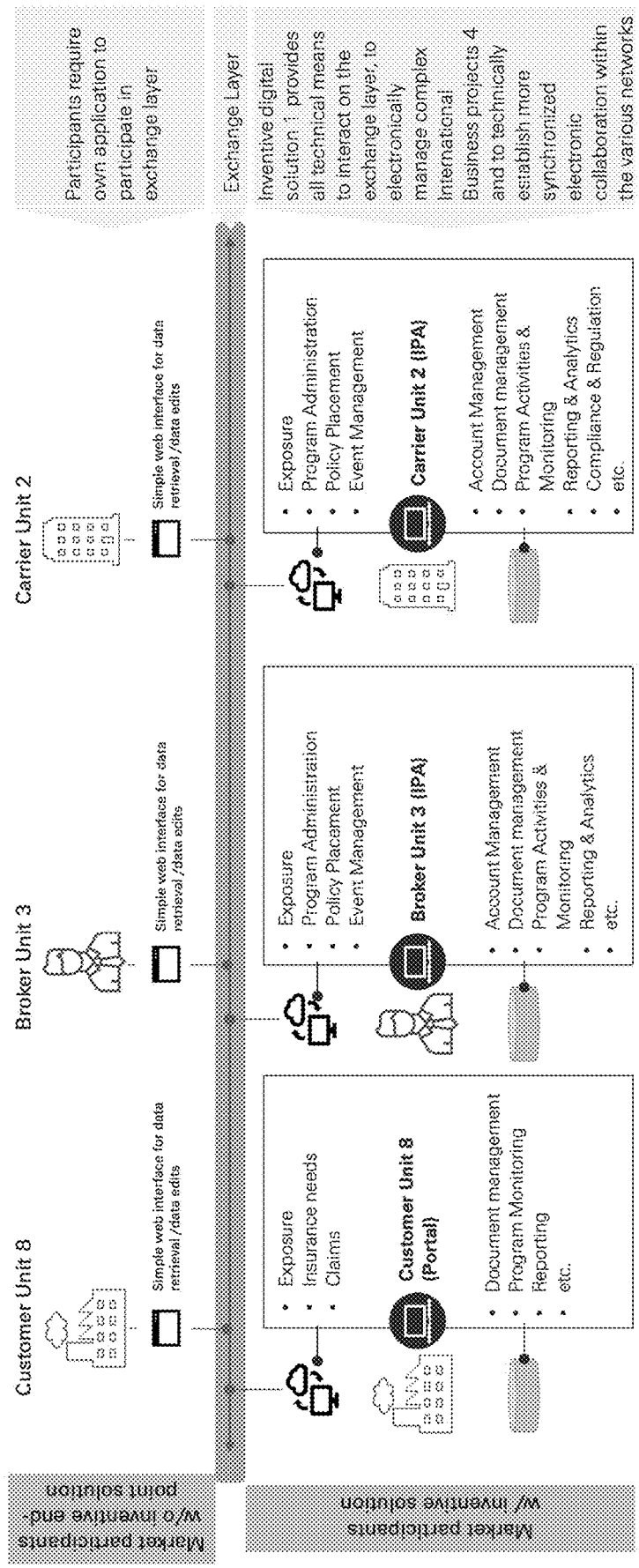
FIG. 7 shows a block diagram, schematically illustrating the digital platform 1 enabling participants 2/3/8 with all required technical functionality to participate in the exchange layer. For participants 2/3/8 without inventive end-point solution participants 2/3/8 require own application to participate in exchange layer. For participants 2/3/8 with the inventive solution, the inventive digital solution 1 provides all technical means to interact on the exchange layer, to electronically manage complex International Business projects 4 and to technically establish more synchronized electronic collaboration within the various networks.
Figure 8:
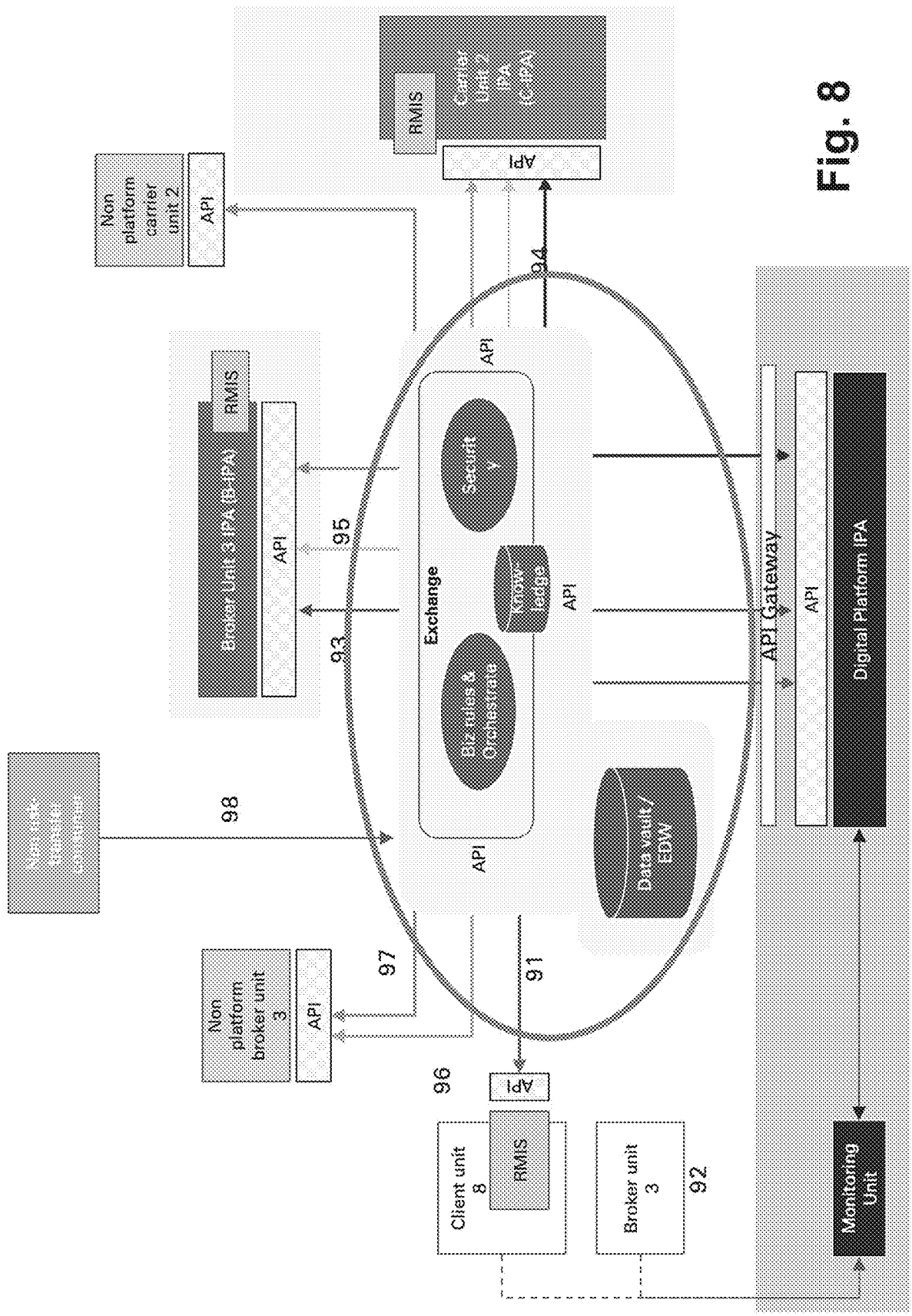
FIG. 8 shows a block diagram, schematically illustrating a closed ecosystem provided by the digital platform 1 for automated, electronic, cross-network handling of international business projects 4. The reference numeral 9 denotes the various interactions and processes of an inventive digital cross-network platform's 1 ecosystem; 91 denotes a risk-transfer data exchange with client units 8 providing an automated exposure management as a digital service; 92 denotes a broker units' 3 non-platform, restricted access by the monitoring unit only, e.g. only allowing to provide a view into policy parameters and claims' parameter; 93 denotes the data transaction with broker units 3 (via digital platform 1) providing automated placements and risk-transfer management; 94 denotes data transaction with other carrier units 2 for digital cross-networking and risk pooling (IPaaS); 95 denotes the direct transaction between broker unit 3 (B-IPA) and carrier unit 2 (C-IPA) providing automated placements and/or risk-transfer management; 96 denotes data transaction with non-platform broker units 3 (with other carrier units 2) providing automated placements and risk-transfer management; 97 denotes data transaction between a non-platform broker unit 3 and a non-platform carrier unit 2 providing automated placements and/or risk-transfer management; 98 denotes non-risk-transfer participation units interacting in the process (for example electronic banking unit providing technical means for monetary transactions). The above-mentioned monitoring unit providing restricted access for non-platform units can e.g. be realized as external or integrated technical online platform that allowing customer units 8, carrier units 2 and/or broker units 3 to monitor and manage specific risk-transfer projects or programs 4 from one secure digital environment. It can combine several aspects of risk-transfer programs/projects 4 onto one easy-to-use platform and providing access to real-time information. The monitoring unit can provide the technical means for reviewing specific policy parameters, real-time tracking of premium parameters and transfers, automated submitting of loss notifications, real-time monitoring of parameters of claims, tracking process and triggering progress of measured risk improvements etc. Further, in FIG. 8, API an application programming interface allowing to define interactions between the multiple software intermediaries of the platform 1. The API also allows to define the kinds of calls or requests that can be made, how to make them, the data formats that should be used, the conventions to follow, etc. It can also provide extension mechanisms so that the units 2/3/8 can extend existing functionality in various ways and to varying degrees. The API can be entirely custom, specific to a component, or it can be designed based on an appropriate industry standard to ensure interoperability. The API can be realized so that any change of the internal details behind the API does not affect the access of the units 2/3/8. The API can e.g. be realized as an Axway API Gateway, inter alia allowing to deliver digital applications across cloud, mobile and digital channels, the Axway API Gateway can further provide real-time operational monitoring and analytical reporting to provide IT, business and operational units 2/3/8 visibility into the API usage. The integration allows to combine API usage data with information from other modules to provide end-to-end visibility into B2B data flows. The reference numeral RMIS denotes an automated digital risk management information system providing an information system that allows assisting in consolidating property parameter values, claim parameter values, policy parameter values, and exposure information data and providing the tracking and management reporting capabilities to enable the units 2/3/8 to monitor and control the overall parameters for the risk management. EDW denotes a data warehouse, in particular an enterprise data warehouse, which is used e.g. for reporting and data analysis within the platform 1. The EDW is a core component of cross-networking platform's 1 intelligence. The EDW is one of the central repositories of integrated data from one or more disparate sources. It allows storing current and historical data in one single place that are used for creating analytical reports for the units 2/3/8 throughout a project 4. The data stored in the warehouse can be uploaded partially to the operational platform 1. The data can e.g. pass through an operational data store, whereas data cleansing can be performed for additional operations to ensure the needed data quality before it is used in the EDW. Extracting, transforming, loading and extracting, loading, transforming are important technical means to realize the used EDW.
Figure 9:
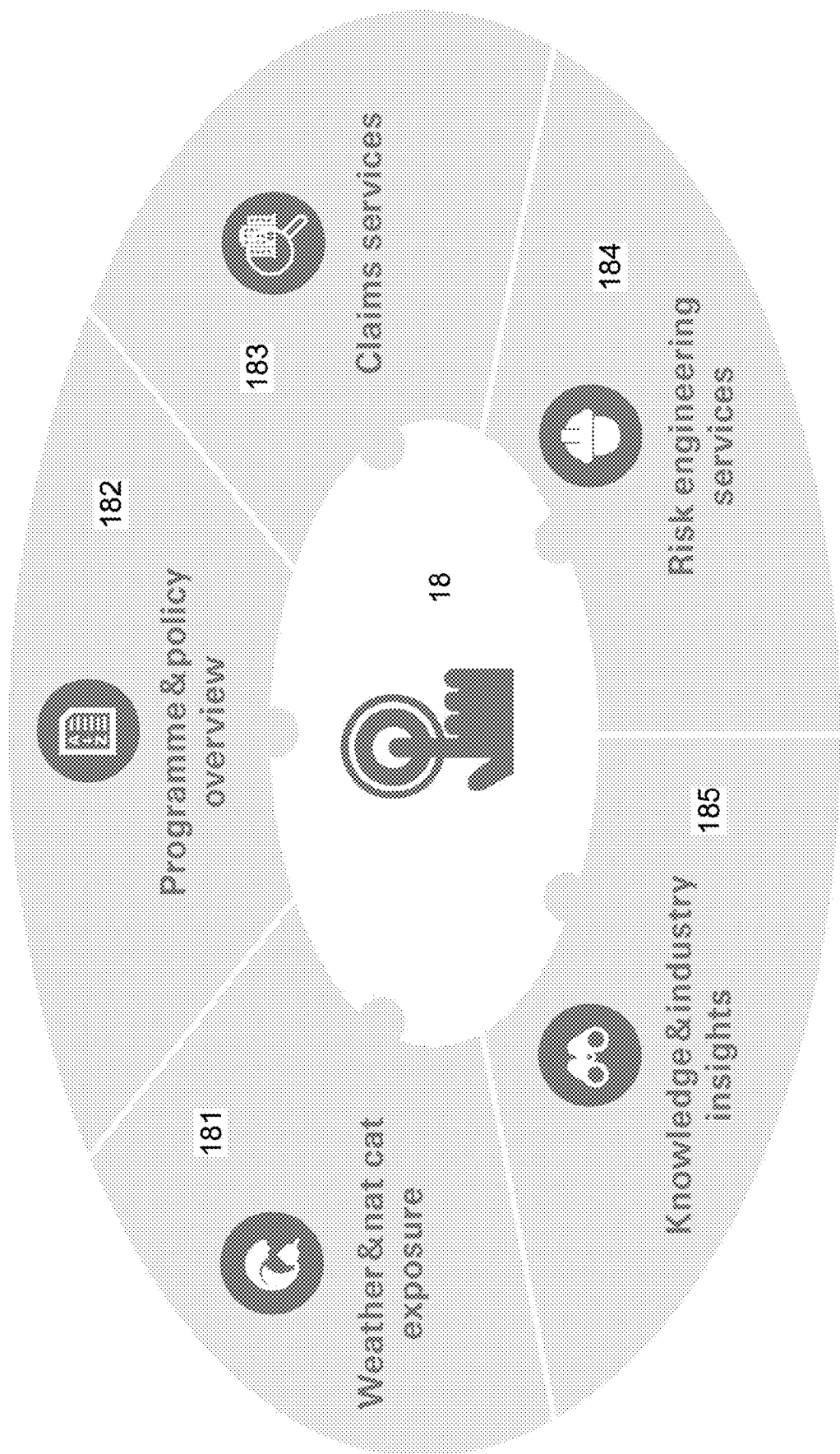
FIG. 9 shows a block diagram, schematically illustrating the functionality of the monitoring and surveillance unit 18. The monitoring and surveillance unit 18 allows, for example, the units 2/3/8 to control and access to real-time monitoring of state and fluctuations of policy parameters, claim parameters and/or risk improvement information data and expert system advising. It provides reviewing of policy parameters, automated submitting loss notifications, monitoring of claims' parameters, or tracking of progress of risk improvement measures. The reference numeral 181 provides monitoring of weather measuring parameters and natural catastrophe exposure measure; 182 provides monitoring of project/program and policy parameters; 183 provides monitoring, tracking and managing of claims' parameter and service parameter; 184 provides monitoring, tracking and managing of risk engineering parameter and service parameters; and 185 provides expert system advising with system-generated knowledge and industry parameters insights.
Figure 12:
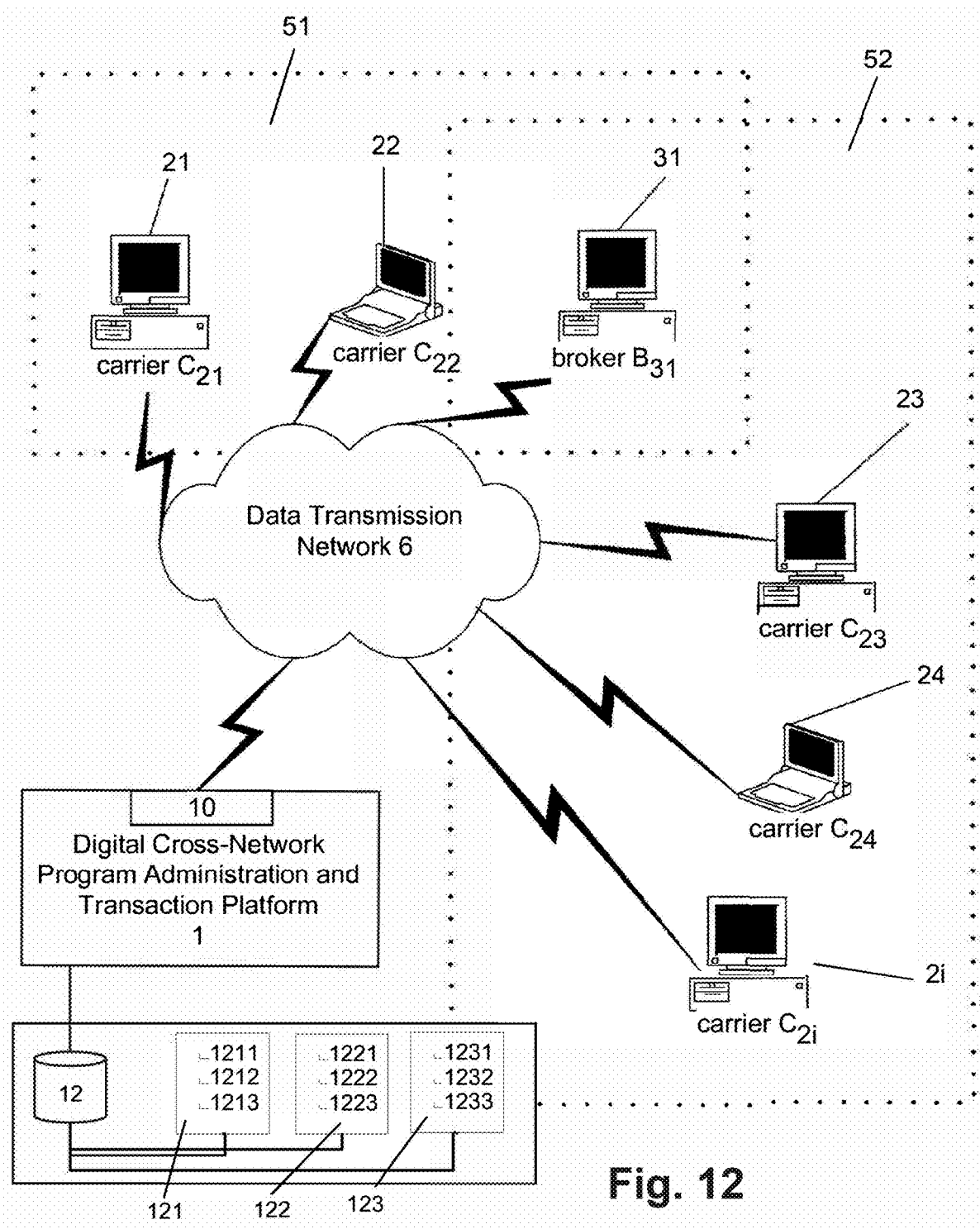
Figure 13:
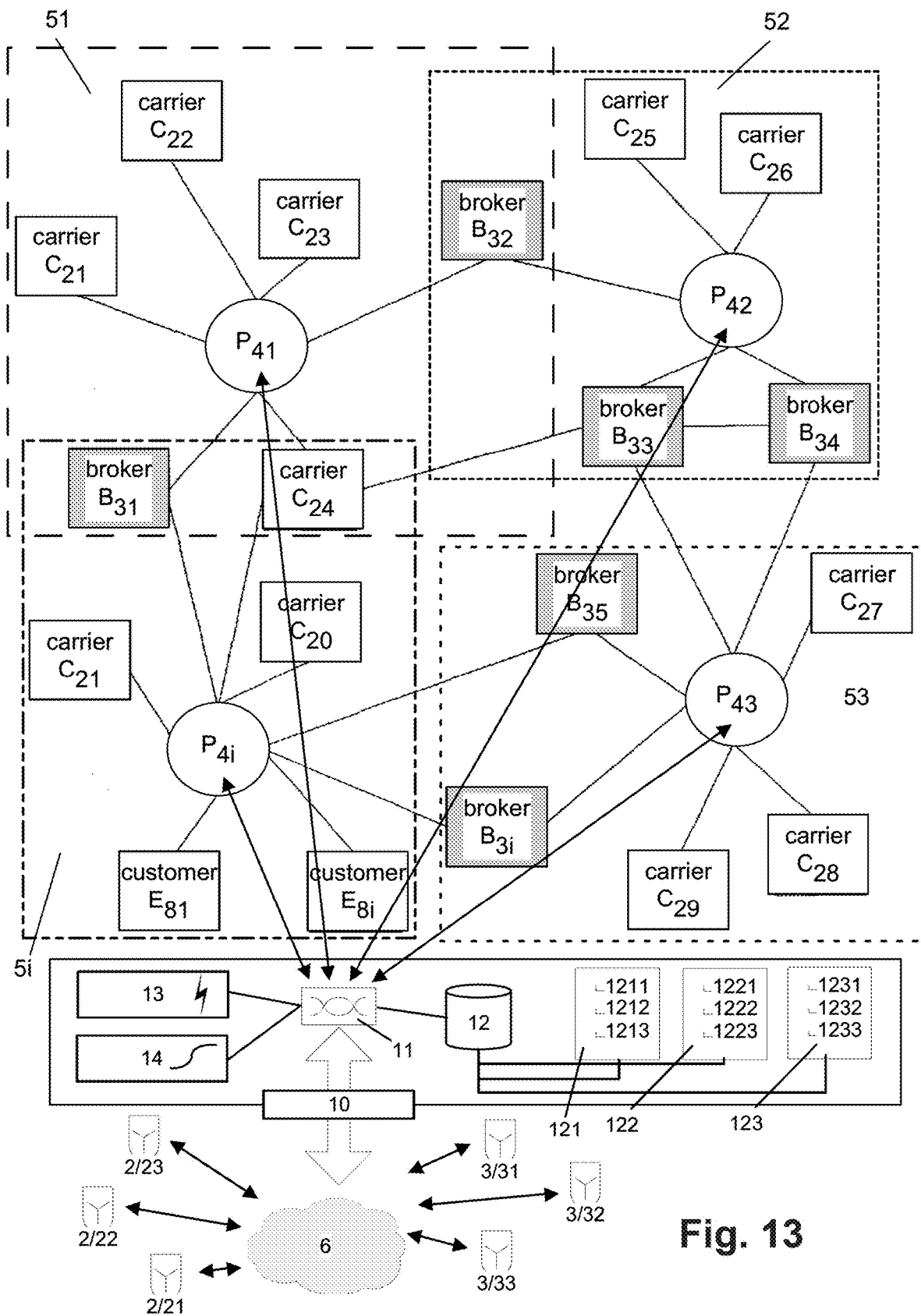
Figure 14:
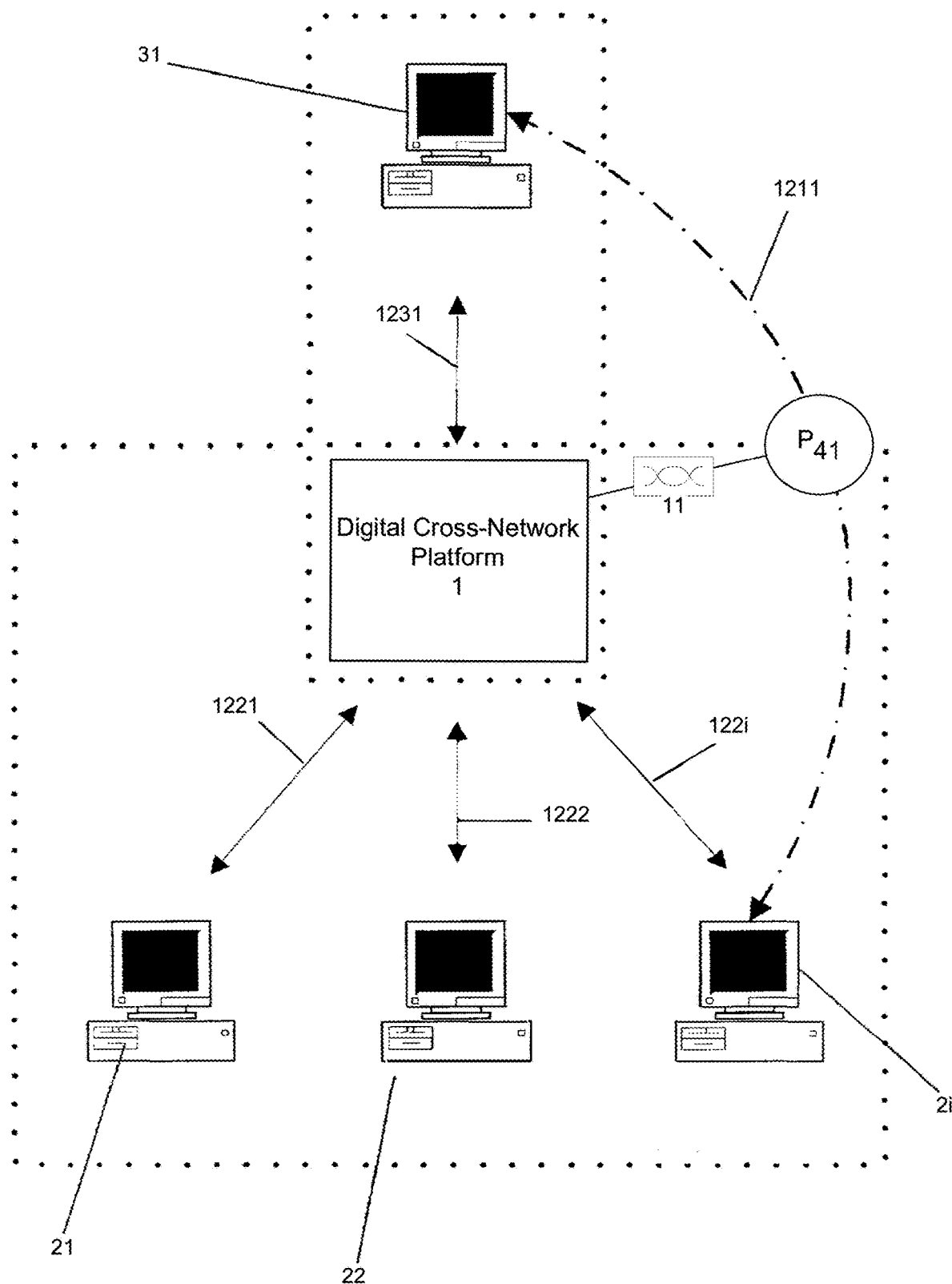

FIGS. 12-14 show block diagrams, schematically illustrating the digital cross-network platform 1 providing controlled data- and process-driven cross-network interaction and program 41, 42, . . . , 4i development between heterogeneous units 2/3 with network-enabled devices on a secured cloud-based network 5/51, 52, . . . , 5i. In particular, FIGS. 5-7 schematically illustrate different interrelationship configuration within the digital platform 1 of the present invention.

DETAILED DESCRIPTION OF THE PREFERRED EMBODIMENTS

FIGS. 3-7 schematically illustrate an architecture for a possible implementation of an embodiment of the inventive digital platform 1 for providing controlled data- and process-driven cross-network interaction and program 41, 42, . . . , 4i ($P_{41}, P_{42}, \ldots, P_{4i}$) development between heterogeneous units 2/3 with network-enabled devices on a secured cloud-based network 5/51, 52, . . . , 5i. The digital platform 1 provides inter alia automated data management and cloud platform technologies to dynamically orchestrate complex international cross-network program 41, 42, . . . , 4i ($P_{41}, P_{42}, \ldots, P_{4i}$) development processes across an intelligent digital environment, so that units 2/3/8 can perform their data- and/or measuring parameter-driven tasks in real-time. The digital platform 1 forms the foundation of all intelligent activities within a project 41, 42, . . . , 4i ($P_{41}, P_{42}, \ldots, P_{4i}$). The digital platform 1 provides machine-learning based intelligence project-related processes such as analytics, machine learning (MO, artificial intelligence (AI), the Internet of Things (IoT), and blockchain structures. They are delivered through the digital platform, e.g. embedded within intelligent suite applications.

In a learning process of a machine-learning based connector, learning cycles of a machine-learning based intelligence of a machine-learning based connector are based on data sets of stored historical programs associated with a modular digital program data element as input learning parameter values to the machine-learning based intelligence. Note that an assigned relationship is established between the pair of units by the machine-learning based connector providing possible linkage between pairs of units automatically assigned or selectable by at least one of the units involved in the linkage for establishing the assigned relationship.

The machine-learning based intelligence of the machine-learning based connector is based on reinforcement learning or unsupervised learning or supervised learning comprising an automated feedback loop to at least one unit. The machine-learning based intelligence of the machine-learning based connector comprises at least a data mining process for extracting relationship related patterns from the data sets of the stored historical programs based on the modular digital program data element. Further, a cluster analysis structure is automatically provided by the data mining process of the machine-learning based intelligence of the machine-learning based connector.

The cluster analysis structure is provided by a Kmeans- or Iterative Self-Organizing Data Analysis Technique (ISO-DATA) or hierarchical structure using the modular digital program data element as input learning parameter values to the machine-learning based intelligence. A classification structure is automatically provided by the data mining process of the machine-learning based intelligence of the machine-learning based connector. Further, the classification structure is provided by a Classification and Regression Trees (CART)—or K-Nearest Neighbors (KNN)—or neural network or a Support Vector Machine (SVM) structure using the modular digital program data element as input learning parameter values to the machine-learning based intelligence.

Structurally, the present invention extends prior art secure computer network within a new technical scheme to include different users 2/3 from different networks, from different organizations, on different machines and from varying geographic locations and regulatory/environmental boundary condition backgrounds. Thus, the present invention allows users 2/3 to exchange confidential information, generate/implement program/project development processes, and so on, across corporate and geographic boundaries through secure connections over a distributed network, such as the Internet. For example, the digital platform 1 and the units 2/3/8 and/or associated measuring devices can be connected via at least one network for signal transmission. The network can comprise e.g. a telecommunication network as a wired or wireless network, e.g. the Internet (world-wide backbone network), a GSM-network (Global System for Mobile Communication), an UMTS-network (Universal Mobile Telecommunications System) and/or a WLAN (Wireless Local Region Network), a Public Switched Telephone Network (PSTN) and/or dedicated point-to-point communication lines. The digital platform 1 and the units 2/3/8 comprise one or more interfaces to connect to the communication network according to the according transmission standard or protocol. The digital platform 1 comprises the mentioned hardware- and/or software-based functional modules interacting electronically with and for the signal generation of the digital platform.

Within the digital platform 1, each user 2/3 has a user account. The user or unit account can comprise a unit profile holding the user- or unit-specific data or parameter values. Users 2/3 are related within the digital platform 1 assigned to programs 41, 42, . . . , 4i and group characteristics, as e.g. carrier units 2 and broker units 3 for collaboration and program development. A broker units 3 is access unit enabled to manage acquisition and selling of products or assets on behalf of another. The broker units 3 acts on behalf of a client unit, which is typically a risk-exposed unit seeking risk fencing by appropriate risk-transfer, to provide the client units with placements of risk coverage they need and to mediate buying that coverage from a risk-transfer carrier unit 2. The broker unit 3 is a specialized unit for supporting risk management. Essentially, broker units 3 act as an expert unit to risk-exposed units. Typically, broker units 3 receive a commission transfer for their services and usage. The broker unit's 3 compensation is typically provided by the carrier unit 2 as a percentage of risk-transfer/ policy premium. A risk-transfer carrier unit 2, also called an risk-transfer provider unit provides the monetary resource-pooling behind the coverage provided in a risk-transfer policy, which defines the risk-transfer parameters. It is the issuer of the policy and the one who charges the premium and covers losses and claims under the policy. In return for charging a certain premium, the insurance company promises to pay the insured for certain monetary losses due to various covered claims' scenarios. Nevertheless, the distinct difference between a broker unit 3 and a risk-transfer carrier unit 2 is that the carrier unit 2 bears the risk while the broker unit 3 provides expert services acting as an expert system. Note that the operational units can also comprise customer units 8, so that the inventive cross-network platform 1 provides a large number of data exchanges amongst carrier units 2, broker units 3 and customer units 8.

Relationships between users 2/3 on a program 41, 42, . . . , 4i are defined on an individual basis and based on the group characteristics assigned to a specific user 2/3, such that each pair of users 2/3 has a defined relationship. Each relationship establishes a hierarchic or even relationship between two users: such as carrier unit 2/carrier unit 2, carrier unit 2/broker unit 3, and so on. The individual relationships can also define overlapping programs 41, 42, . . . , 4i of users 2/3 providing complex collaboration structures. Each program 41, 42, . . . , 4i can e.g. be made up of at least on broker unit 3 and one or more, but typically a plurality of carrier units 2, and each relationship between the broker 3 and each carrier 2 on the program 41, 42, . . . , 4i is defined individually or by classes/groups. By building up the digital platform 1 according to user 2/3 relationships, in essence, the secured network structure(s) 5 is given by the structure of the relationships. Instead of a single network with many users, the system defines multiple user-centric networks 5/51, 52, . . . , 5i, which parallel real-world networks 6 of people. Project/program related measuring parameters and/or unit 2/3/8 related measuring parameters, e.g. associated with the impact of occurring natural disaster events (e.g. earthquake, storms, hurricanes related measuring parameters as location-specific temperature measures, wind-field measuring parameters, water temperature parameters etc.) are measured and transmitted to the digital platform 1 and stored assigned to the related project 41, 42, . . . , 4i, wherein the operational interaction of the digital platform in processing the project 41, 42, . . . , 4i is adapted by means of the modules described below. A control unit controller of the digital platform 1 can comprise one or more trigger modules to scan for measuring devices assigned to the units 2/3/8 for project/program related measuring parameters and/or unit 2/3/8 related measuring parameters and to select measurable measure parameters capturing or partly capturing a process dynamic and/or static characteristic of at least one unit 2/3/8 and/or measurable risk-exposure associated with at least one unit 2/3/8 or project 41, 42, . . . , 4i evolving from possible occurrence of the mentioned natural disaster events or other project- or user-specific risk-events.

As an embodiment variant and as indicated above, each assigned relationship is hierarchical defining at least two subgroups with a first subgroup 2) comprising a plurality of carrier units $C_{21}, C_{21}, \ldots, C_{2i}$ defined by modular carrier unit data element 1221, 1222, . . . , 122i and a second subgroup 3 comprising a plurality of broker units $B_{21}, B_{21}, \ldots, B_{2i}$ defined by modular broker unit data elements 1231, 1232, . . . , 123i. Such an embodiment variant of the digital platform 1 may be particular suitable for automated processing and development of international risk-transfer programs. In this context, the secured cloud-based network access 5/51, 52, ..., 5$i$ provided by the secure data transmission network interface 11 to a specific program 41, 42, ..., 4$i$ can e.g. be different for the first subgroup of the carrier units $C_{21}, C_{21}, ..., C_{2i}$ and the second subgroup 3 of the broker units $B_{21}, B_{21}, ..., B_{2i}$.

As a possible embodiment of the physical hardware of the digital platform 1, the digital platform 1 comprises a web server 16 and a persistent storage 12, which can be connected to the data transmission network 6 via a secure data transmission network interface 10, and a firewall 171. The firewall 171 is connected via a router 172 to the data transmission network 6, in particular the worldwide backbone network Internet 61. Authorized users 2/3 access programs 41, 42, ..., 4$i$ stored in the persistent storage 12 accessible by the web server 17 through a secure connection over the data transmission network 6. The persistent storage 12 refers herein to non-volatile storage. The persistent storage 12 is realized to store data as a non-volatile device during and after the running of a process code and/or program. The persistent storage 12 can further comprise data structures as a data store or a data warehouse able to store a variety of data and data formats. The persistent storage 12 can be used for international cross-network collaboration holding more than programs 41, 42, ..., 4$i$, wherein a secure collaborative environment within a program corporation over the international backbone internet network 6 is provided by means of the persistent storage 12.

Authorized users 2/3 are users who have registered and authorized accounts with the digital platform 1. Authorized users 2/3 can, for example, access the digital platform 1 using any web-enabled device, including desktop or laptop computers, personal digital assistants (such as iPads etc.), web-enabled cellular and/or digital phones, and other web 61 enabled or data transmission network 6 enabled devices. Herein, "web-enabled device" means devices capable of browsing the Internet using Internet browser, while "network-enabled devices" generally refer to devices allowing access over the data transmission network 6 to the digital platform 1. Further, the digital platform 1 can comprise automated productivity tools, which are modules that supplement the user 2/3 account with professional enhancements for facilitating interactions between different users 2/3 of the digital platform 1, such as between a broker units 3 and carrier units 2, and so on. In the embodiment, the network server 17 of the digital platform 1 is realized as a secure server. For this, "secure server" can e.g. refers to a server 17 that is registered with a digital certificate authority for the purpose of authenticating the server and of providing secure transactions over the Internet. The secure data transmission over the network 6 can further comprise appropriate encryption-/decryption processes to ensure the secured network 51, 52, ..., 5$i$. In summary, the network-interfaces of the digital cross-network platform 1 can e.g. be web-interfaces and the network-enabled devices can be web-enabled devices, wherein the digital cross-network platform 1 comprises selectable productivity tools for interfacing with the programs 41, 42, ..., 4$i$. In addition, the productivity tools being accessible from a web interface can further comprising a task manager module 13 and a collaboration module 11 and a document management module 14, as described herein.

Each unit has a unit or user 2/3 account in the digital cross-network platform 1 with assigned authentication and authorization credentials for authentication and authorization controlled network access 5 to the digital cross-network platform 1 and the secured cloud-based network 5. The authentication and authorization credentials can at least comprise a user name and a password in a secured database. However, other authentication and authorization variants, as biometric-based authentication and authorization are also imaginable. Each unit 2/3 further has an assigned relationship with one or more other units 2/3 comprised in the persistent storage 12 of the digital networking platform 1. Each assigned relationship provides a defined relationship between the one or more other units 2/3 or a subgroup of the one or more other units 2/3 and an associated program 41, 42, ..., 4$i$, the digital cross-network platform 1. Further, each relationship is unique relative to each pair of users 2/3, in particular users 2/3 can have more than one relationship assigned.

The digital platform 1 comprises a database 15 for hosting all communication between units 2/3 on the secure network 5 and a network-interface for users of the units 2/3 using network-enabled devices of the units 2/3 to upload information to the persistent storage 12 and to share the uploaded information with other people according to the assigned relationship.

The assigned relationship is established between the pair of users prior to any communication between the pair of user units 2/3 is permitted based on modular digital program data elements 1211, 1212, ..., 121$i$ of the persistent storage 12 capturing the assigned relationship in respect to a program 41, 42, ..., 4$i$ associated with a modular digital program data element 1211, 1212, ..., 121$i$. A secured cloud-based network access 5/51, 52, ..., 5$i$ is provided by a secure data transmission network interface 11 of the digital cross-network platform 1 over the data transmission network 6 for each generated program 41, 42, ..., 4$i$ and units 2/3 based on the associated modular digital program data element 1211, 1212, ..., 121$i$ and relationship, respectively.

In the context of automated risk-transfer program development and processing, the digital cross-network platform 1 can further comprise a quote module or a quote server interface for interacting periodically with a quote module or quote server, for retrieving financial information from the quote module or quote server, and for storing the retrieved financial information in the persistent storage 12 associated with a program 41, 42, ..., 4$i$. Additionally, the digital cross-network platform 1 can e.g. comprise an accounting module 16 for displaying financial information, the financial information comprising financial account information relative to the unit 2/3 or user accounts, and a cost basis; and evaluation data related to the financial account information, the evaluation data being generated from the financial account information using retrieved risk exposure characteristics data associated with a specific program 41, 42, ..., 4$i$.

Regarding the learning cycles of a machine-learning based intelligence of the machine-learning based connector based on data sets of stored historical programs, the data sets of stored historical programs can e.g. be used by means of the digital cross-network system and platform, as analyzing basis providing a measure for providing the possible linkage between pairs of units using the historical data sets as a value time series of values over the historic time period, the measure e.g. being related to the probability of the matching of the linkage. The digital cross-network system can, according to some embodiments, access a persistence storage, and utilize a probabilistic structure creation unit to automatically create a structure that may be used by the linkage modeling processing to create the probability linkage measure. To process the generated possible linkages, the cumulative predictive parameter modelling by machine learning modules further can comprise the step of generation first linkages based on a historic time series of parameter value patterns, wherein the detection of first linkages is triggered by exceeding the measured deviation from a defined threshold value per a single or set of program parameters. The system and the machine-learning based connector, respectively, can further generate second possible linkages (being more or less likely) based on program parameter patterns and/or program development parameter patterns based on the historic time series. By means of dynamic time normalization the topological distance between the measured time series of the program parameters over a time is determined as a distance matrix and weighed based on their temporal proximity and/or significance. The dynamic time normalization can be realized e.g. based on Dynamic Time Wrapping. A measured time series signal of the historical data set can be matched e.g. as spectral or cepstral value tuples with other value tuples of measured time series signal of historical program data sets. The value tuples can be supplemented, for example, with further program parameters such as one or more of present program data sets. Using a weighting for the individual program parameters of each measured value tuple, a difference measure between any two values of the two signals is established, for example a normalized Euclidean distance or the Mahalanobis distance. The machine-learning based connector searches for the most favorable path from the beginning to the end of both signals via the spanned distance matrix of the pairwise distances of all points of both signals. This can be done e.g. dynamic efficient. The actual path, i.e. the wrapping, is generated by backtracking after the first pass of the dynamic time normalization. For the pure determination, i.e. the corresponding template selection, the simple pass without backtracking is sufficient. The backtracking, however, allows an exact mapping of each point of one signal to one or more points of the respective other signal and thus represents the approximate time distortion. It should be added that in the present case, due to algorithmic causes in the extraction of the signal parameters of the value tuples, the optimal path through the signal difference matrix may not necessarily correspond to the actual time distortion. By means of a statistical data mining unit of the machine-learning based connector, the measured, dynamically time-normalized, and weighted time series are then clustered into disjoint clusters based on the measured distance matrix (cluster analysis), whereby time series of a first cluster index a possible linkage in a norm range and measured time series of a second cluster index a possible linkage outside the norm range. Clustering, i.e. cluster analyses, can thus be used to assign similarity structures in the time series, whereby the groups of similar time series found in this way are referred to here as clusters and the group assignment as clustering. The clustering by means of the machine-learning based connector is done here by means of data mining, where new cluster areas can also be found by using data mining. The automation of the statistical data mining unit for the clustering of the distance matrix can be realized e.g. based on density based spatial cluster analysis processing with noise, in particular the density based spatial cluster analysis with noise can be realized based on DBScan. DBScan as spatial cluster analysis with noise works density based and is able to detect multiple clusters. Noise points are ignored and returned separately.

As a pre-processing step, e.g. pre-processing, a dimensionality reduction of the time series can be performed. In general, the analysis data described above are composed of a large number of different time series, e.g. with a predefined sampling rate, if required by the data sets fo the historical programs. Here, each variable can be divided into two types of time series, for example: (1) Time-sliced time series, when the time series can be naturally divided into smaller pieces when a process or dynamic of a historic program is over (e.g., operational cycles, day time cycles etc.); and (2) Continuous time series: When the time series cannot be split in an obvious way and processing must be done on it (e.g., sliding window, arbitrary splitting, . . . ). In addition, time series can also be univariate or multivariate: (1) Univariate time series: the observed process is composed of only one series of observations (e.g. structural parameters of the historic program); (2) Multivariate time series: The observed process is composed of two or more measurable series of observations that could be correlated (e.g., structural parameters and condition/state of the historic program or an element of the historic program).

The use of time series for processing steps of a multitude of historic programs presents a technical challenge, especially if the time series are of different lengths (e.g., program parameter time series). In the context of the inventive digital cross-network platform, it may therefore be technically advantageous to preprocess these time series into a more directly usable technical format using preprocessing. Using the dimensionality reduction method, a latent space can be derived from a set of time series of historic programs. This latent space can be realized as a multidimensional space containing features that encode meaningful or technically relevant properties of a high-dimensional data set. Technical applications of this concept can be found in natural language processing (NLP) methods with the creation of a word embedding space derived from text data or, in the present case, a time series embedding space, or in image processing, where a convolutional neural network encodes higher-order features of images (edges, colors . . . ) in its final layers. According to the invention, this can be technically realized by creating a latent space of several time series of historic programs from program parameter data values and using this latent space as a basis for subsequent tasks such as event detection, classification or regression tasks. In the present case, a latent space can be generated for time series signals with technical approaches such as principal component analysis and dynamic time wrapping, and also with deep learning-based technical approaches similar to those used for computer vision and NLP tasks, such as autoencoders and recurrent neural networks.

Regarding the generation of the time series embedding space, the fundamental technical problem that complicates the technical modeling by the machine-learning based connector and other learning problems in the present case is dimensionality. A time series or sequence on which the model structure is to be tested is likely to be different from any time series sequence seen during training, which is not only caused by the weighting problem. Technically, possible approaches may be based, for example, on n-grams that obtain generalization by concatenating very short overlapping sequences seen in the training set. In the present case, however, the dimensionality problem is combated by learning a distributed representation for weighted parameters that allows each training set to inform the model about an exponential number of proximity measures. The modelling simultaneously learns (1) a distributed representation for each time series along with (2) the likelihood function for time series sequences expressed in terms of proximity. Generalization is achieved by giving a sequence of time series that has never been recognized before a high probability if it consists of time series that are similar (in the sense of a close representation) to time series that form a set that has already been seen. Training such large models (with millions of parameters) within a reasonable time can itself be a technical challenge. As a solution for the present case, neural networks are used, which can be used e.g. for the likelihood function. On two time series sets of historical program data, it could be shown that the approach used here provides significantly better results compared to state-of-the-art n-gram models, and that the proposed approach allows to use longer time series and time series contexts.

In the present case, the ability of multilayer backpropagation networks to learn complex, high-dimensional, non-linear mappings from large collections of examples makes these neural networks, particularly Convolutional Neural Networks, technical candidates for the time series recognition tasks. However, there are technical problems for application in the present invention: In the technical structures for pattern recognition for generating possible linkages, typically a manually designed feature extractor collects relevant information from the input and eliminates irrelevant variability. A trainable classifier then categorizes the resulting feature vectors (or strings) into classes. In this scheme, standard, fully connected multilayer networks can be used as classifiers. A potentially more interesting scheme is to eliminate the feature extractor, feed the mesh with "raw" inputs (e.g., normalized images), and rely on backpropagation to turn the first few layers into a suitable feature extractor. While this can be done with an ordinary fully connected feed-forward network with some success for the task of detecting the time series, there are technical issues in the present context. First, time series of measurement parameters can be very large. A fully-linked first layer, e.g., with a few hundred hidden units, would therefore already require several 10'000 weights. An overfitting problem occurs if not enough training data is available. Also the technical requirements for the storage medium grow enormously with such numbers. However, the technical skin problem is that these networks have no inherent invariance with respect to local biases in the input time series. That is, the pre-processing discussed above with the appropriate normalization or other time normalization must normalize and center the time series. Technically, on the other hand, no such pre-processing is perfect.

Second, a technical problem of fully-linked networks is that the topology of the input time series is completely ignored. The input time series can be applied to the network in any order without affecting the training. However, in the present case, the processing process has a strong local 2D structure, and the time series of program parameters have a strong 1D structure, i.e., program parameters which are temporally adjacent are highly correlated. Local correlations are the reason that extracting and combining local features of the time series before recognizing the spatial or temporal objects is proposed in the context of the invention. Convolutional neural networks thereby enforce the extraction of local features by restricting the receptive field of hidden units to local units. In the present case, the use of Convolutional Networks technically ensures in the recognition of the time series that displacement and depletion invariance is achieved, namely through the application of local receptive fields, joint weights (or weight replications), and temporal subsampling of the time series. The input layer of the networks thereby receives time series that are approximately time-normalized and centered (see Time Wrapping above).

For generating the latent space for the time series signals, as described above, e.g. principal component analysis and dynamic time wrapping or deep learning based technical approaches can be chosen, such as the use of recurrent neural networks. However, in the present invention, it should be noted that learning information over longer time intervals using recurrent backpropagation can take a very long time, usually due to insufficient decaying error feedback. Therefore, in the context of the invention, the use of a new, efficient and gradient-based method. Here, the gradient is truncated where it does no harm so that the network can learn to bridge minimal time delays of more than 1000 discrete time steps by enforcing a constant error flow through constant rotations of the errors within a specific unit. Multiplicative gate units thereby learn to open and close access to the constant error flow. By this embodiment according to the invention, the network remains local in space and time with respect to learning the time series.

With respect to the autoencoder embodiment comprised by the machine-learning based connector, the network is trained in an unsupervised manner (unsupervised learning) so that the input signal can first be converted to low-dimensional latent space and reconstructed by the decoder with minimal information loss. The method can be used to convert high-dimensional time series into low-dimensional ones by training a multi-layer neural network with a small central layer to reconstruct the high-dimensional input vectors. Gradient descent can be used to fine-tune the weights in such "autoencoder" networks. However, this only works well if the initial weights are close to a suitable solution. In learning the time series, the embodiment described here provides an effective way of initializing the weights that allows the autoencoder network to learn low-dimensional codes that perform better than principal component analysis as a tool for reducing the dimensionality of data. Dimensionality reduction of time series according to the invention facilitates classification, visualization, communication, and storage of high-dimensional time series. One possible method is principal component analysis (PCA), which finds the directions of greatest variance in the time series and represents each data point by its coordinates along each of these directions. For example, as an embodiment variant, a nonlinear generalization of PCA can be used by using an adaptive multilayer "encoder" network to transform high-dimensional time series into low-dimensional codes, and a similar decoder network to recover the time series from the codes. In the embodiment, starting from random weights in the two networks, they can be trained together by minimizing the discrepancy between the original time series and their reconstruction. The system obtains the required gradients by applying a chain rule to propagate the error derivatives back first through the decoder network and then through the encoder network. This system is referred to here as an autoencoder.

The above-discussed unsupervised machine learning procedure for dynamic time-wrapping based (DTW) time series detection, can also be done supervised. Two execution variants of learning strategies, supervised and unsupervised, can be applied with the DTW for the time series according to the invention. For example, two supervised learning methods, incremental learning and learning with priority denial, can be distinguished as execution variants. The incremental learning procedure is conceptually simple, but typically requires a large set of time series for matching. The learning procedure with priority denial can effectively reduce the matching time, while typically slightly decreasing the recognition accuracy. For the execution variant of unsupervised learning, in addition to the variant discussed above, an automatic learning approach based on most-matching learning and based on learning with priority and rejection can also be used, for example. The most-matching learning revealed here can be used to intelligently select the appropriate time series for system learning. The effectiveness and efficiency of all three machine learning approaches for DTW just proposed can be demonstrated using appropriate time series detection test.

In case of detecting first and/or second possible linkages associated with the historical programs, the measured dynamics or statuses are transmitted as a function of time as input data patterns to a machine-learning unit and the linkage parameters respectively the program parameters are adjusted by means of an electronic control comprised by the digital cross-network platform based on the output values of the machine-learning unit, wherein the machine-learning unit classifies the input patterns on the basis of learned patterns and generates corresponding metering parameters. By additionally program parameters, the machine-learning unit can be further adapted to the input patterns on the basis of the historic time series of program data. The machine-learning unit may be implemented, for example, based on static or adaptive fuzzy logic systems and/or supervised or unsupervised neural networks and/or fuzzy neural networks and/or genetic algorithm-based systems. The machine-learning unit may comprise, for example, Naive Bayes classifiers as a machine-learning structure. The machine-learning unit may be implemented, for example, based on supervised learning structures comprising Logistic Regression and/or Decision Trees and/or Support Vector Machine (SVM) and/or Linear Regression as machine-learning structure. For example, the machine-learning unit may be realized based on unsupervised learning structures comprising K-means clustering or K-nearest neighbor and/or dimensionality reduction and/or association rule learning. The machine-learning unit may be realized, for example, based on reinforcement learning structures comprising Q-learning. For example, the machine-learning unit may be implemented based on ensemble learning comprising bagging (bootstrap aggregating) and/or boosting and/or random forest and/or stacking. Finally, the machine-learning unit can be realized based on neural network structures comprising feedforward networks and/or Hopfield networks and/or convolutional neural networks or deep convolutional neural networks.

LIST OF REFERENCE SIGNS

1 Digital Cross-Network Platform
   10 Secure Data Transmission Network Interface
   11 Collaboration Module
   12 Persistent Storage
      121 Data Segment comprising program data elements $121i$ of $P_{4i\ 1211,\ 1212,\ \ldots,\ 121}i$ Modular Digital Program Data Element capturing $P_{4i}$
      122 Data Segment comprising carrier data elements $122i$ of $C_{2i\ 1221,\ 1222,\ \ldots,\ 122}i$ Modular Digital Carrier Data Element capturing $C_{2i}$
      123 Data Segment comprising broker data elements $123i$ of $B_{2i\ 1231,\ 1232,\ \ldots,\ 123}i$ Modular Digital Broker Data Element capturing $B_{3i}$
   13 Task Manager Module
   14 Document Management Module
   15 Database
   16 Accounting Module
   17 Web Server/Network Server
      171 Firewall
      172 Router
   18 Monitoring and surveillance unit
      181 Weather measuring parameters and natural catastrophe exposure measure monitoring
      182 Project/program and policy parameter monitoring
      183 Claims' parameter monitoring and service parameter tracking and management
      184 Risk engineering parameter monitoring and service parameters tracking and management
      185 Expert system advising with knowledge and industry parameters insights
2 Carrier units
   21 Carrier Unit ($C_{21}$) associated with modular carrier unit data element 1221
   22 Carrier Unit ($C_{22}$) associated with modular carrier unit data element 1222
   . . .
   $2i$ Carrier Unit ($C_{2i}$) associated with modular digital carrier unit data element $122i$
3 Broker units
   31 Broker Unit ($B_{21}$) associated with modular carrier unit data element 1231
   32 Broker Unit ($B_{22}$) associated with modular carrier unit data element 1232
   . . .
   $3i$ Broker Unit ($B_{2i}$) associated with modular digital carrier unit data element $123i$
4 Programs/Projects
   41 Program ($P_{41}$) associated with modular digital program data element 1211
   42 Program ($P_{42}$) associated with modular digital program data element 1212
   . . .
   $4i$ Program ($P_{4i}$) associated with modular digital program data element $121i$
5 Secured Network and Network Accesses
   51 Secured Network Access for Program 41 ($P_{41}$)
   52 Secured Network Access for Program 42 ($P_{42}$)
   . . .
   $5i$ Secured Network Access for Program $4i$ ($P_{4i}$)
6 Data transmission Network
   61 Internet, World Wide Backbone Network
7 Processes
   71 Placement process
   72 Program administration processes
   73 Reporting and data analytics processes
8 Customer/Client units
   81 Customer Unit ($E_{21}$) associated with modular carrier unit data element 1281
   82 Customer Unit ($E_{22}$) associated with modular carrier unit data element 1282
   . . .
   $8i$ Customer Unit ($E_{2i}$) associated with modular digital carrier unit data element $128i$
9 Digital cross-network platform's 1 ecosystem interaction
   91 Risk-transfer data exchange with client units 8—Automated exposure management as a digital service
   92 Broker units' 3 non-platform, reduced access by monitoring unit only—view into policy parameters and parameters of the claims
   93 Data transaction with broker units 3 (via digital platform 1)—automated 94 Data transaction with other carrier units 2 for digital cross-networking and risk pooling (IPaaS)

95 Direct transaction between broker unit 3 (B-IPA) and carrier unit 2 (C-IPA) —automated placements and/or risk-transfer management 96 Data transaction with non-platform broker units 3 (with other carrier units 2) —automated placements and risk-transfer management 97 Data transaction between a non-platform broker unit 3 and a non-platform carrier unit 2 (automated placements and/or risk-transfer management)

98 Non-risk-transfer participation units interacting in process (for example electronic banking unit providing technical means for monetary transactions)

The invention claimed is:

1. A digital cross-network platform for providing controlled data and process-driven cross-network interaction and program development between heterogeneous units with network-enabled devices on a secured cloud-based network, each unit having a unit account in the digital cross-network platform with assigned authentication and authorization credentials for authentication and authorization controlled network access to the digital cross-network platform and the secured cloud-based network, and each unit having an assigned relationship with one or more other units stored in a persistent storage of the digital networking platform, each assigned relationship providing a defined relationship between the one or more other units and an associated program of a plurality of programs, the digital cross-network platform comprising:

monitoring circuitry;

a database to host all communication between the units on the secured cloud-based network; and a network-interface configured to receive uploaded information from users of the units using the network-enabled devices, the uploaded information being uploaded to the persistent storage, and to share the uploaded information with other units according to the assigned relationship, wherein the assigned relationship is established between a respective pair of the units prior to any communication between the pair of the units is permitted based on modular digital program data elements of the persistent storage capturing the assigned relationship in respect to the associated program of the plurality of programs associated with a modular digital program data element of the modular digital program data elements, wherein each assigned relationship is hierarchical defining at least two subgroups with a first subgroup comprising a plurality of carrier units defined by modular carrier unit data elements and a second subgroup comprising a plurality of broker units defined by modular broker unit data elements, a secured cloud-based network access provided by a secure data transmission network interface to the associated program of the plurality of programs is different for the first subgroup of the carrier units and the second subgroup of the broker units, wherein the secured cloud-based network access is provided by the secure data transmission network interface of the digital cross-network platform over a data transmission network for each generated program of the plurality of programs and units based on the associated modular digital program data element and relationship, respectively, the digital cross-network platform comprising a single digital data and event exchange layer for data exchange between participating units of the associated program of the plurality of programs establishing data access via data standards for the participating units of the associated program of the plurality of programs, wherein the monitoring circuitry is an integrated technical part for automated real-time monitoring and surveillance of the associated program of the plurality of programs capturing sensory data from associated integrated measuring and sensory devices and providing real-time measuring and information flows regarding the associated program of the plurality of programs, and wherein the automated real-time monitoring and surveillance comprises measuring probabilities measures for occurrences of natural hazard events at least comprising flood and/or earthquake and/or hurricane events providing geo risk measuring of natural hazard exposures of the associated program of the plurality of programs based on location and objects associated with the associated program of the plurality of programs, the integrated measuring and sensory devices comprising geo risk measuring providing swift measuring and risk measurements of natural hazard exposures and occurrence probabilities, measuring the occurrence probability from individual locations to allocations of locations and objects by combining physical hazard measurements.

2. The digital cross-network platform according to claim 1, wherein the network-interface and the data transmission network interface are web-interfaces and the network-enabled devices are web-enabled devices, the digital cross-network platform further comprising selectable productivity tools to interface with the plurality of programs, the productivity tools being accessible from a web interface and comprising at least a task manager module and a collaboration module and a document management module.

3. The digital cross-network platform according to claim 1, further comprising a quote server interface to interact periodically with a quote module, to retrieve financial information from the quote module, and to store the retrieved financial information in the persistent storage associated with a program of the plurality of programs.

4. The digital cross-network platform according to claim 1, wherein the persistent storage is used in an international cross-network collaboration holding more than programs, the persistent storage providing a secure collaborative environment within a program corporation over the data transmission network.

5. The digital cross-network platform according to claim 1, wherein the authentication and authorization credentials comprise at least a username and a password in a secured database.

6. The digital cross-network platform according to claim 1, wherein the assigned relationship is established between the pair of units involving a rule-based structure being based at least partially on account information held in the unit or user account.

7. The digital cross-network platform according to claim 1, wherein the assigned relationship is established between the pair of units by a machine-learning based connector providing possible linkage between pairs of units automatically assigned or selectable by at least one of the units involved in the linkage for establishing the assigned relationship.

8. The digital cross-network platform according to claim 3, further comprising an account module to display monetary information data, the financial information comprising financial account information relative to the unit or user accounts, and a cost basis, and evaluation data related to the financial account information, the evaluation data being generated from the financial account information using retrieved risk exposure characteristics data associated with a specific program of the plurality of programs.

9. The digital cross-network platform according to claim 7, wherein, in a learning process of the machine-learning based connector, learning cycles of a machine-learning based intelligence of the machine-learning based connector are based on data sets of stored historical programs associated with the modular digital program data element as input learning parameter values to the machine-learning based intelligence.

10. The digital cross-network platform according to claim 9, wherein the machine-learning based intelligence of the machine-learning based connector is based on reinforcement learning or unsupervised learning or supervised learning comprising an automated feedback loop to at least one unit.

11. The digital cross-network platform according to claim 9, wherein the machine-learning based intelligence of the machine-learning based connector comprises at least a data mining process for extracting relationship related patterns from the data sets of the stored historical programs based on the modular digital program data element.

12. The digital cross-network platform according to claim 11, wherein a cluster analysis structure is automatically provided by the data mining process of the machine-learning based intelligence of the machine-learning based connector.

13. The digital cross-network platform according to claim 11, wherein a classification structure is automatically provided by the data mining process of the machine-learning based intelligence of the machine-learning based connector.

14. The digital cross-network platform according to claim 12, wherein the cluster analysis structure is provided by a Kmeans or Iterative Self-Organizing Data Analysis Technique (ISODATA) or hierarchical structure using the modular digital program data element as input learning parameter values to the machine-learning based intelligence.

15. The digital cross-network platform according to claim 13, wherein the classification structure is provided by a Classification and Regression Trees (CART) or K-Nearest Neighbors (KNN) or neural network or a Support Vector Machine (SVM) structure using the modular digital program data element as input learning parameter values to the machine-learning based intelligence.

* * * * *